United States Patent
Lo Faro et al.

(10) Patent No.: US 10,034,570 B2
(45) Date of Patent: Jul. 31, 2018

(54) CAPSULE BASED SYSTEM FOR PREPARING AND DISPENSING A BEVERAGE

(71) Applicants: Gian Matteo Lo Faro, Key West, FL (US); Alan M. Crosby, Sudbury, MA (US); George Kingman Bonnoitt, Jr., Amherst, NH (US); David Preston Adams, North Hampton, NH (US); Alan Kenneth Stratton, Milford, NH (US)

(72) Inventors: Gian Matteo Lo Faro, Key West, FL (US); Alan M. Crosby, Sudbury, MA (US); George Kingman Bonnoitt, Jr., Amherst, NH (US); David Preston Adams, North Hampton, NH (US); Alan Kenneth Stratton, Milford, NH (US)

(73) Assignee: LaVit Technology LLC, New York, NY (US)

(*) Notice: Subject to any disclaimer, the term of this patent is extended or adjusted under 35 U.S.C. 154(b) by 25 days.

(21) Appl. No.: 14/828,067

(22) Filed: Aug. 17, 2015

(65) Prior Publication Data
US 2016/0051080 A1 Feb. 25, 2016

Related U.S. Application Data

(63) Continuation-in-part of application No. 14/536,142, filed on Nov. 7, 2014, which is a continuation-in-part
(Continued)

(51) Int. Cl.
*A47J 31/06* (2006.01)
*A47J 31/40* (2006.01)
(Continued)

(52) U.S. Cl.
CPC ........ *A47J 31/407* (2013.01); *A47J 31/3628* (2013.01); *A47J 31/3633* (2013.01);
(Continued)

(58) Field of Classification Search
CPC .. A47J 31/407; A47J 31/4492; A47J 31/4482; A47J 31/3628; A47J 31/3695; A47J 31/3633
(Continued)

(56) References Cited

U.S. PATENT DOCUMENTS

| 3,101,870 A | 8/1963 | Betner ................ 222/153.07 |
| 3,295,998 A | 1/1967 | Goros ........................... 99/282 |

(Continued)

FOREIGN PATENT DOCUMENTS

| DE | 3446093 A1 | 6/1986 |
| DE | 29618751 U1 | 2/1997 |

(Continued)

OTHER PUBLICATIONS

PCT Search Report and Opinion, PCT/US15/49743 dated Apr. 6, 2016.
(Continued)

*Primary Examiner* — Thien S Tran
(74) *Attorney, Agent, or Firm* — Clifford H. Kraft

(57) ABSTRACT

A beverage dispensing system that can dispense both cold and hot drinks from either cold drink capsules or hot drink capsules. The cold or hot drink capsule is inserted into the system, and the lid is manually closed. if a cold drink capsule has been inserted, a mechanism cracks the capsule along a predetermined seam, injects cold mixing fluid into the capsule, and then rotates the capsule to pour out or further flush out the cold drink into a cup. If a hot drink capsule has been inserted, the lid is closed, and a rotating needle pierces the top of the capsule. The capsule is then
(Continued)

punctured from the bottom. Hot water can then be injected into the top of the capsule, and the hot drink can be removed from the bottom into a cup.

19 Claims, 28 Drawing Sheets

Related U.S. Application Data of application No. 13/293,043, filed on Nov. 9, 2011, now abandoned.

(51) Int. Cl.
*A47J 31/44* (2006.01)
*A47J 31/36* (2006.01)

(52) U.S. Cl.
CPC ....... *A47J 31/3695* (2013.01); *A47J 31/4482* (2013.01); *A47J 31/4492* (2013.01)

(58) Field of Classification Search
USPC ....... 99/282, 287, 288, 289 R, 290; 426/112, 426/115
See application file for complete search history.

(56) References Cited

U.S. PATENT DOCUMENTS

| | | | |
|---|---|---|---|
| 3,743,520 A | 7/1973 | Croner | 426/87 |
| 4,091,930 A | 5/1978 | Buchner et al. | 229/200 |
| 4,207,989 A | 6/1980 | Ingemann | |
| 4,437,499 A | 3/1984 | Devale | |
| 4,492,295 A | 1/1985 | DeWoolfson | |
| 4,708,827 A | 11/1987 | McMillin | |
| 4,749,580 A | 6/1988 | Demyanovich | |
| 4,808,346 A | 2/1989 | Strenger | |
| 4,863,036 A | 9/1989 | Heijenga | 229/123.1 |
| 5,073,312 A | 12/1991 | Burrows | |
| 5,156,329 A | 10/1992 | Farrell | 229/125.35 |
| 5,156,871 A | 10/1992 | Goulet | |
| 5,316,603 A | 5/1994 | Akazawa et al. | 156/69 |
| 5,393,032 A | 2/1995 | Cederroth | |
| 5,419,461 A | 5/1995 | Goulet | |
| 5,433,374 A | 7/1995 | Forbes, Jr. | 229/125.35 |
| 5,472,719 A | 12/1995 | Favre | |
| 5,613,617 A | 3/1997 | Da Vitoria Lobo | 220/359.2 |
| 5,792,391 A | 8/1998 | Vogel | |
| 5,906,845 A | 5/1999 | Robertson | |
| 6,085,942 A | 7/2000 | Redmond | 222/107 |
| 6,145,705 A | 11/2000 | Wallace et al. | |
| 6,182,554 B1 | 2/2001 | Beaulieu et al. | |
| 6,240,832 B1* | 6/2001 | Schmed | A47J 31/3623 221/121 |
| 6,490,966 B2 | 12/2002 | Mariller et al. | |
| 6,584,888 B2 | 7/2003 | Cortese | |
| 6,606,938 B2 | 8/2003 | Taylor | |
| 6,748,850 B1 | 6/2004 | Kraan | |
| 6,857,252 B2 | 2/2005 | Haberstroh et al. | |
| 6,886,690 B2 | 5/2005 | Petricca | 206/356 |
| 6,935,624 B2 | 8/2005 | Bellas | |
| 6,945,157 B2 | 9/2005 | Brown et al. | |
| 6,994,015 B2* | 2/2006 | Bruinsma | A47J 31/4407 99/289 R |
| 7,032,507 B2 | 4/2006 | Cai | |
| 7,165,488 B2 | 1/2007 | Bragg et al. | |
| 7,216,582 B2 | 5/2007 | Yoakim et al. | |
| 7,320,274 B2 | 1/2008 | Castellani | |
| 7,347,138 B2 | 3/2008 | Bragg et al. | |
| 7,412,921 B2 | 8/2008 | Hu et al. | |
| 7,581,658 B2* | 9/2009 | Mosconi | A47J 31/3642 221/156 |
| 7,921,766 B2 | 4/2011 | Halliday et al. | |
| 7,926,414 B1 | 4/2011 | Wolcott et al. | |
| 8,291,812 B2 | 10/2012 | Rivera | |
| 8,418,603 B2 | 4/2013 | Mahlich | |
| 8,431,175 B2 | 4/2013 | Yoakim | |
| 8,443,718 B2 | 5/2013 | Denisart et al. | |
| 8,445,047 B2 | 5/2013 | Ozanne | |
| 8,490,541 B2 | 7/2013 | Drost | |
| 8,495,949 B2 | 7/2013 | Tinkler et al. | |
| 8,516,948 B2 | 8/2013 | Zimmerman et al. | |
| 8,573,114 B2 | 11/2013 | Huang et al. | |
| D698,239 S | 1/2014 | De Pra | |
| 8,621,982 B2 | 1/2014 | Nosier et al. | |
| D699,567 S | 2/2014 | De Pra | |
| 8,678,234 B2 | 3/2014 | Doleman et al. | |
| 8,722,124 B2 | 5/2014 | Ozanne | |
| 8,733,229 B2 | 5/2014 | Jarisch et al. | |
| 8,770,094 B2 | 7/2014 | Rithener | |
| 8,784,915 B2 | 7/2014 | Evers et al. | |
| 8,800,431 B2 | 8/2014 | Sullivan et al. | |
| D713,719 S | 9/2014 | De Pra | |
| 8,820,215 B2 | 9/2014 | Bonacci et al. | |
| 8,820,216 B2 | 9/2014 | Vaugniaux et al. | |
| 8,833,238 B2 | 9/2014 | Hansen et al. | |
| 8,857,663 B2 | 10/2014 | Scholvinck et al. | |
| 8,875,617 B2 | 11/2014 | Favre | |
| 8,974,846 B2 | 3/2015 | Burton-wilcock et al. | |
| 8,978,542 B2 | 3/2015 | Talon | |
| 8,978,544 B2 | 3/2015 | Leuzinger et al. | |
| D726,534 S | 4/2015 | Lo Faro | |
| 9,027,463 B2 | 5/2015 | Sullivan et al. | |
| 9,095,236 B2 | 8/2015 | Perentes | |
| D738,151 S | 9/2015 | Lo Faro | |
| D744,856 S | 12/2015 | Lo Faro | |
| 9,271,598 B2 | 3/2016 | Yoakim | |
| 9,277,837 B2 | 3/2016 | Yoakim | |
| D757,535 S | 5/2016 | Lo Faro | |
| 9,326,636 B2 | 5/2016 | Gianelli | |
| 9,434,532 B2 | 9/2016 | Yoakim | |
| 9,486,102 B2 | 11/2016 | Baldo | |
| 2003/0071376 A1 | 4/2003 | Bellas | |
| 2006/0174769 A1 | 8/2006 | Favre | |
| 2006/0175387 A1 | 8/2006 | Yukumoto | |
| 2007/0131687 A1 | 6/2007 | Otto et al. | 220/212 |
| 2007/0164045 A1 | 7/2007 | Wydler | |
| 2007/0175334 A1 | 8/2007 | Halliday et al. | |
| 2008/0148948 A1 | 6/2008 | Evers | |
| 2008/0190937 A1 | 8/2008 | Cho | 220/573.1 |
| 2008/0223741 A1 | 9/2008 | Nyambi et al. | |
| 2009/0155422 A1 | 6/2009 | Ozanne | |
| 2009/0194105 A1 | 8/2009 | Besseler et al. | |
| 2009/0241782 A1 | 10/2009 | Van Dillen et al. | 99/279 |
| 2009/0272275 A1 | 11/2009 | De Graaff | |
| 2010/0003371 A1 | 1/2010 | Ozanne | |
| 2010/0064897 A1* | 3/2010 | Trio | A47J 31/3614 99/289 R |
| 2010/0147157 A1* | 6/2010 | Tanner | A47J 31/46 99/295 |
| 2010/0154644 A1 | 6/2010 | Skalski | |
| 2010/0154649 A1 | 6/2010 | Skalski et al. | |
| 2010/0162898 A1 | 7/2010 | Mahlich | |
| 2010/0162901 A1 | 7/2010 | Mahlich | |
| 2010/0173056 A1 | 7/2010 | Yoakim | |
| 2010/0180775 A1 | 7/2010 | Kollep et al. | |
| 2010/0186599 A1 | 7/2010 | Yoakim | |
| 2010/0239728 A1 | 9/2010 | De Graaff | |
| 2011/0017071 A1 | 1/2011 | Stefanoni | |
| 2012/0171334 A1 | 7/2012 | Yoakim et al. | |
| 2012/0231126 A1 | 9/2012 | Lo Faro | |
| 2012/0298258 A1 | 11/2012 | Rithener | |
| 2012/0328740 A1 | 12/2012 | Nocera | |
| 2013/0014648 A1 | 1/2013 | Rognon et al. | |
| 2013/0071532 A1 | 3/2013 | Pribus | |
| 2013/0061764 A1 | 4/2013 | Rivera | |
| 2013/0129870 A1 | 5/2013 | Novak | |
| 2013/0186046 A1 | 7/2013 | Magniet | |
| 2013/0189400 A1 | 7/2013 | Pribus | |
| 2013/0230627 A1 | 9/2013 | Hansen et al. | |
| 2013/0236609 A1 | 9/2013 | Magniet | |
| 2013/0239820 A1 | 9/2013 | Baldo | |
| 2013/0312619 A1 | 11/2013 | Spiegel et al. | |
| 2013/0323371 A1 | 12/2013 | Kutcher | |

(56) References Cited

U.S. PATENT DOCUMENTS

| | | |
|---|---|---|
| 2014/0023765 A1 | 1/2014 | Ozanne et al. |
| 2014/0023766 A1 | 1/2014 | Ozanne et al. |
| 2014/0083873 A1 | 3/2014 | Capitani et al. |
| 2014/0134299 A1 | 5/2014 | Guidorzi et al. |
| 2014/0141141 A1 | 5/2014 | Giannelli |
| 2014/0166686 A1* | 6/2014 | Rlghetti .............. A47J 31/3642 221/1 |
| 2014/0302204 A1 | 10/2014 | Evers et al. |
| 2014/0314926 A1 | 10/2014 | Hanes et al. |
| 2014/0338542 A1 | 11/2014 | Smith et al. |
| 2014/0338543 A1 | 11/2014 | Smith et al. |
| 2014/0342067 A1 | 11/2014 | Sullivan et al. |
| 2014/0342069 A1 | 11/2014 | Tinkler et al. |
| 2014/0352547 A1 | 12/2014 | Leuzinger |
| 2014/0360377 A1 | 12/2014 | Yoakim |
| 2015/0017288 A1 | 1/2015 | Lo Faro |
| 2015/0040768 A1 | 2/2015 | Leuzinger |
| 2015/0047509 A1 | 2/2015 | Trombetta et al. |
| 2015/0079240 A1 | 3/2015 | Lo Foro |
| 2015/0041493 A1 | 5/2015 | Scholvinck et al. |
| 2015/0135965 A1 | 5/2015 | Lo Foro |
| 2015/0144000 A1 | 5/2015 | Burton-wilcock et al. |
| 2015/0144001 A1 | 5/2015 | Lo Foro |
| 2015/0147448 A1 | 5/2015 | Lo Foro |
| 2015/0150294 A1 | 6/2015 | Sinnema et al. |
| 2015/0201789 A1 | 7/2015 | Smith et al. |
| 2015/0223631 A1 | 8/2015 | Bentley et al. |
| 2015/0238045 A1 | 8/2015 | Hansen et al. |
| 2015/0257578 A1 | 9/2015 | Windler |
| 2015/0013279 A1 | 11/2015 | Swerchesky |
| 2016/0220970 A1 | 8/2016 | James |
| 2016/0242594 A1 | 8/2016 | Empl |
| 2016/0255990 A1 | 9/2016 | Bartoli |
| 2017/0202247 A1 | 7/2017 | Lo Faro |
| 2017/0233178 A1 | 8/2017 | Lo Faro |

FOREIGN PATENT DOCUMENTS

| | | |
|---|---|---|
| EP | 332885 A1 | 9/1989 |
| EP | 0745425 | 12/1996 |
| EP | 1844805 A1 | 10/2007 |
| EP | 2345355 | 7/2011 |
| EP | 2415375 | 2/2012 |
| EP | 2525691 | 11/2012 |
| EP | 2640232 | 9/2013 |
| GB | 1115285 | 5/1968 |
| GB | 2380990 A1 | 4/2003 |
| WO | WO2004064585 | 1/2004 |
| WO | WO-2005/079637 A1 | 9/2005 |
| WO | WO2007016977 | 2/2007 |
| WO | WO 2009130311 | 10/2009 |
| WO | WO-2010/025392 A2 | 3/2010 |
| WO | WO2011051867 | 5/2011 |
| WO | WO2012/064885 | 5/2012 |
| WO | WO2013007487 | 6/2012 |
| WO | WO2013119495 | 2/2013 |
| WO | WO2013119497 | 2/2013 |
| WO | WO2013119534 | 2/2013 |
| WO | WO2013119543 | 2/2013 |
| WO | WO2015034496 | 9/2013 |
| WO | WO2014096082 | 12/2013 |
| WO | WO2014184653 | 5/2014 |
| WO | WO2014206814 | 6/2014 |
| WO | WO2015006443 | 7/2014 |
| WO | WO2015009580 | 7/2014 |
| WO | WO2015021557 | 8/2014 |
| WO | WO2015055849 | 10/2014 |
| WO | WO2015/009580 | 1/2015 |
| WO | WO2015109062 | 1/2015 |
| WO | WO 2015055849 | 4/2015 |
| WO | WO2014027235 | 11/2015 |
| WO | WO2016/043822 | 3/2016 |
| WO | WO2016/073069 | 5/2016 |
| WO | WO2016/122718 | 8/2016 |

OTHER PUBLICATIONS

PCT/US14/46450 International Search Rpt and Written Opinion, dated Nov. 20, 2014.
European Search Report corresponding to European Application No. 11840149.6, dated Aug. 23, 2013, 6 pages.
International Search Report and Written Opinion dated Mar. 27, 2012 for corresponding International Patent Application No. PCT/US2011/060050 (13 pages).
U.S. Appl. No. 15/391,163, dated Dec. 27, 2016, La Faro.
U.S. Appl. No. 14/609,713, dated Jan. 30, 2015, James.
U.S. Appl. No. 14/536,142, dated Nov. 11, 2014, La Faro.
U.S. Appl. No. 15/357,268, dated Nov. 21, 2016, La Faro.
U.S. Appl. No. 15/784,507, dated Oct. 16, 2017, La Faro.
International Search Report and Written Opinion PCT/US15/3650, dated Sep. 25, 2015.
International Search Report and Written Opinion PCT/US15/49589, dated Jan. 30, 2015.
European Search Report App # 14826965.7, dated Jan 30, 2017.

* cited by examiner

FRONT VIEW

LEFT VIEW

RIGHT VIEW

REAR VIEW

TOP VIEW

BOTTOM VIEW

5 - MOTOR-DRIVEN ARM BEGINS TO FORCE CUP FURTHER DOWNWARDS AGAINST OUTLET NEEDLE; PLASTIC CUP BOTTOM DEFLECTS BEFORE PIERCING OCCURS

CAPSULE BASED SYSTEM FOR PREPARING AND DISPENSING A BEVERAGE

This is a continuation-in-part of application Ser. No. 14/536,142 filed Nov. 7, 2014 which was a continuation-in-part of application Ser. No. 13/293,043 filed Nov. 9, 2011. Application Ser. Nos. 14/536,142 and 13/293,043 are hereby incorporated by reference in their entireties.

BACKGROUND

Field of the Invention

The present invention relates generally to beverage dispensing systems and more particularly to a complete beverage dispensing system that can dispense both cold and hot drinks.

Description of the Prior Art

There are a number of devices and techniques for dispensing a beverage such as, for example, a cup of coffee or tea from a capsule. In one approach a disposable container fits on top of a cup and has a compartment for receiving a beverage extract such as coffee with a large reservoir on top into which a person must pour boiling water. These devices can be disposable but expensive, the coffee is exposed to the air where it can easily get stale or contaminated, and they are not generally suitable for automatic coffee making or other beverage machines. Because the flow rate of beverage is generally slow, these devices are typically large relative to the volume of beverage dispensed. Also, these devices can be designed to be used upright and only the bottom area is available for filtration flow and this contributes to the slowness of the filtration process. In one construction, a filter is provided in a sealed receptacle and a support member is included intermediate the receptacle and filter which functions to support the filter. When the filter is wetted, it sags and conforms with the support member which has a hole in it to release the filtered beverage but otherwise blocks the output of the filter. Such a filter design used in an application where water is injected under pressure would provide low flow rates.

There are several known companies offering proprietary capsule based machines in the coffee and tea space, including Nestlé's Nespresso and Special T, Green Mountain Coffee Roaster's Keurig, Starbucks Verismo, Kraft's Tassimo, Sara Lee's Senseo, Nescafe's Dolce Gusto, Illy, Lavazza's Blue and Britta Yource. Mars Flavia and Esio are machines utilizing a pouch-style single use dispensing system. Additionally, there are several known companies operating single serving drink machines in the commercial environment, including PHSI's Interpure, Waterlogic's Innowave, Vertex's Charm, Keurig, Nestlé and Mars Flavia.

Currently, there are other machines attempting to commercialize a similar capsule/pod based single-serve point of use cold beverage system. For example, Omnifrio, acquired by Primo Water, uses a puncture mechanism, which punctures the top and bottom of the capsule allowing a syrup concentrate to drain out. Bevyz uses a pressure mechanism to pop open the capsule to enable a mixing process. The Esio Hot & Cold Beverage System uses a syrup pouch system and pumps drink mix out of the pouch to mix it with water outside of the packet. Yource by Brita uses a capsule based machine.

When cold drinks are dispensed in a system in which the beverage is prepared by mixing cold fluid, usually water, with a powder instead of a liquid concentrate, one significant challenge is that the powder will not dissolve effectively during the mixing process. This can lead to poor quality output from the beverage system and unsightly and possibly unhealthful residue in the machine itself. Improved systems for providing a hot, cold, ambient temperature, carbonated, still mixed beverage designed to enable the effective mixture of the powder with the liquid during dispensing providing for little or no residue, contamination, or cross contamination between beverages are described in U.S. application Ser. No. 13/293,043, U.S. Provisional Application No. 61/411,786, and International Application No. PCT/US2011/060050, all of which are hereby incorporated by reference. The present disclosure describes an additional embodiment for providing mixed beverages.

In addition, there is no machine or system in the prior art that can dispense both cold and hot drinks. It would be highly advantageous to have a single beverage dispensing machine that can receive either a hot drink or a cold drink capsule, process the capsule and dispense the desired hot or cold drink. While the hot and cold drink capsules can be identical in shape and size, it is advantageous to have them of different shapes and sizes. Maintaining the familiar hot drink capsule (such as the well-known coffee capsule used by Green Mountain Keurig) readily identifies it from the cold drink capsule used by LaVit LLC. This prevents mistakes by the user and makes it easier for the system to identify whether a cold drink or a hot drink is desired.

SUMMARY OF THE INVENTION

The present invention comprises a complete hot and cold beverage dispensing system. It is a machine with a compartment adapted to receive a drink mix capsule and a control panel that can display messages to a customer and allow the customer to choose drink options. The present invention also comprises a beverage preparation mechanism or sub-system to totally control the mechanical portion of hot and cold beverage preparation.

To dispense a beverage, a user approaches the machine, places a cold drink capsule or a hot drink capsule into the compartment, closes the lid, and selects the type of drink on the control panel (or the selection may be made automatically by the system based on the type of capsule inserted).

If the selection and capsule represent a cold drink, the machine opens the capsule when the machine cover is closed. An upper nozzle injects a small amount of cold liquid to mix with and dissolve (or dilute) the contents. A second nozzle begins to fill the vessel (cup) below an exit orifice. Simultaneously, an internal mechanism rotates the capsule approximately ninety degrees to empty the contents of the capsule into the vessel. The cold drink capsules can contain a powder or a liquid which is mixed into the filtered water to produce the cold beverage. The drinks can be "house formulas" or common mass market branded beverages licensed from the manufacturers.

The cold drink capsule is opened by cracking and peeling. This method of accessing the capsule offers an effective and efficient way to prepare and deliver the beverage. A mechanical device is adapted to crack the capsule along a crease punched into the capsule below the top cover of the capsule. The mechanical device peels open the capsule along the cracked crease typically when a user closes the lid. For example, a slight crease could be included in a lip of the capsule or directly below it that can be used to break the seal and allow the cover to then be peeled or pried back. As stated, when the cover is peeled back (e.g., tearing open the capsule) the drink is mixed with a mixing stream of liquid, which in many embodiments will be water, either cold or hot, sparkling or still.

If the selection and capsule represent a hot drink, the capsule is punctured by a needle on the bottom by closing the lid. Closing the lid of the machine forces the hot drink capsule down on the needle. An injection needle arm rotates a needle into position that penetrates the lid of the capsule. A hot liquid is injected into the hot capsule to brew or mix the hot drink. The hot drink is forced out of the hole in its bottom by pressure via a hot drink spout into a cup. The hot drink capsule can contain powder, grind (such as ground coffee) or a liquid which is brewed or mixed with injected hot liquid such as hot filtered water.

A purpose of the present invention is to offer a compelling alternative to bottled water and other water based ready-to-drink (RTD) beverages. The invention is meant to offer a convenient, reliable, and cost effective Point of Use solution to the consumer's hydration and beverage needs, both hot and cold. The invention is a single-serve beverage system that can produce unlimited chilled filtered water as well as single serve unique beverages through a cold capsule-based system. The present invention can dispense carbonated, flavored, enhanced, ultra purified filtered waters and flavors, hot coffee, hot and cold tea, hot chocolate and numerous other beverages both hot and cold.

DESCRIPTION OF THE FIGURES

Attention is now directed toward several drawings that illustrate features of the present invention.

Several drawings and illustrations have been presented to aid in understanding the present invention. The scope of the present invention is not limited to what is shown in the figures.

DESCRIPTION OF THE PREFERRED EMBODIMENTS

The present invention comprises a complete hot and cold beverage dispensing system. It also comprises a beverage preparation mechanism or sub-system that can be inserted and removed from a housing to totally control the mechanical portion of hot and cold beverage preparation.

Figure 1:
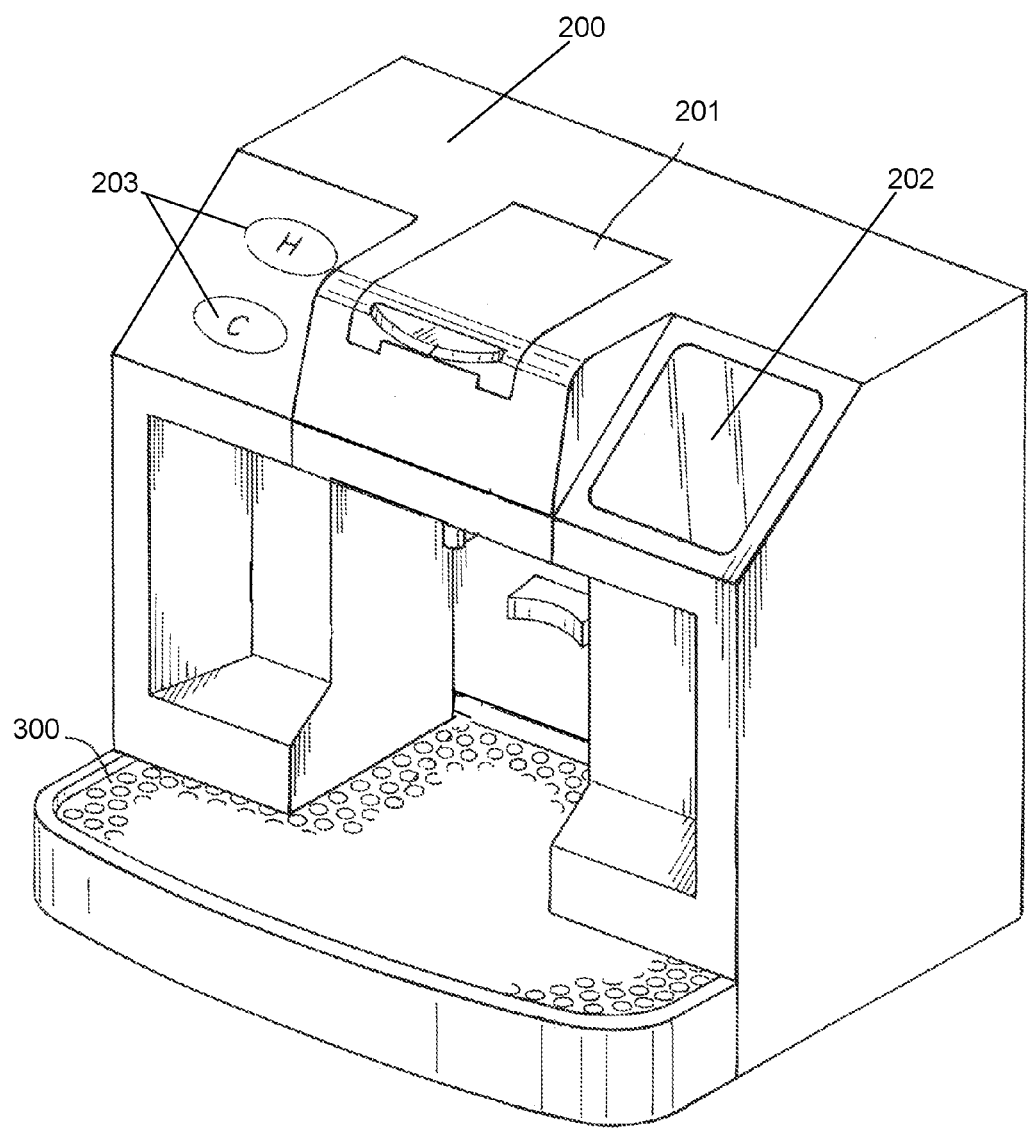
FIG. 1 shows an embodiment of the complete hot and cold beverage dispensing system.

An embodiment of a total beverage dispensing machine or system is shown in FIG. 1 and includes an outer housing (200) with a cover (201) containing a cold and hot water or other liquid supply, a controller that controls all aspects of beverage preparation and dispensing and the beverage preparation mechanism that actually dispenses the drink. The controller is in electrical communication with one or more user control panels (201) where messages can be displayed to the user, and the user can select various beverages. Selections may also be made with buttons (203). In some embodiments, selection of a cold or hot drink is made solely on the basis of what type of capsule is inserted. Typical selections can be cold drinks such as fruit drinks, lemonade, other flavored cold drinks and the like, while hot beverages can include coffee, tea, hot chocolate and the like. The processor can be a microcontroller known in the art, a microprocessor, or any other type of processor or computer configured to store and execute stored instructions. The controller typically includes on-board and external memory. In some embodiments, the controller may have communication capability and be able to communicate status and receive commands over a network like the Internet.

Both hot and cold beverages are supplied in sealed capsules. Cold beverage capsules (or simply cold capsules) are typically roughly diamond-shaped cups with a rim that seats a sealed lid. The cups can contain either powder or liquid cold drink mixes. Each cold capsule typically has a groove, score or indentation either on the rim or directly below the rim. When the capsule is captured by the machine and pressed downward by the user closing the machine lid, the cold capsule can be opened by allowing the rim to encounter a protrusion on one of its ends. The upward force of the protrusion against the rim as the capsule rotates or moves downward causes part of the rim to tear open along the groove providing an opening where cold liquid can be injected into the capsule causing the mixed cold drink to exit the capsule and fill a cup below the mechanism. A typical embodiment of cold capsules are similar to capsules supplied by LaVit LLC of New York for their cold beverage dispensing systems (see pending U.S. patent application Ser. No. 13/293,043 published as 2012/0231126 by some of the same inventors as the present invention). FIG. 2 shows an embodiment of a typical cold capsule.

The hot capsules are similar to the familiar cups supplied by for coffee dispensing by several vendors. For the present invention, the hot capsules can contain other products besides just coffee including tea or hot chocolate for example, or any other hot drink.

Returning to FIG. 1, a view of an embodiment of the system of the present invention can be seen. The housing (200) includes a base (300) and an access lid or cover (201) that allows insertion of a cold or hot capsule. A control panel (201) is also mounted on the housing (200) that allows a user to select and command preparation of a beverage. The housing (200) contains all necessary components including plumbing, liquid heating, control and sensing as well as a hot/cold beverage dispensing module or mechanism.

Figure 2A:
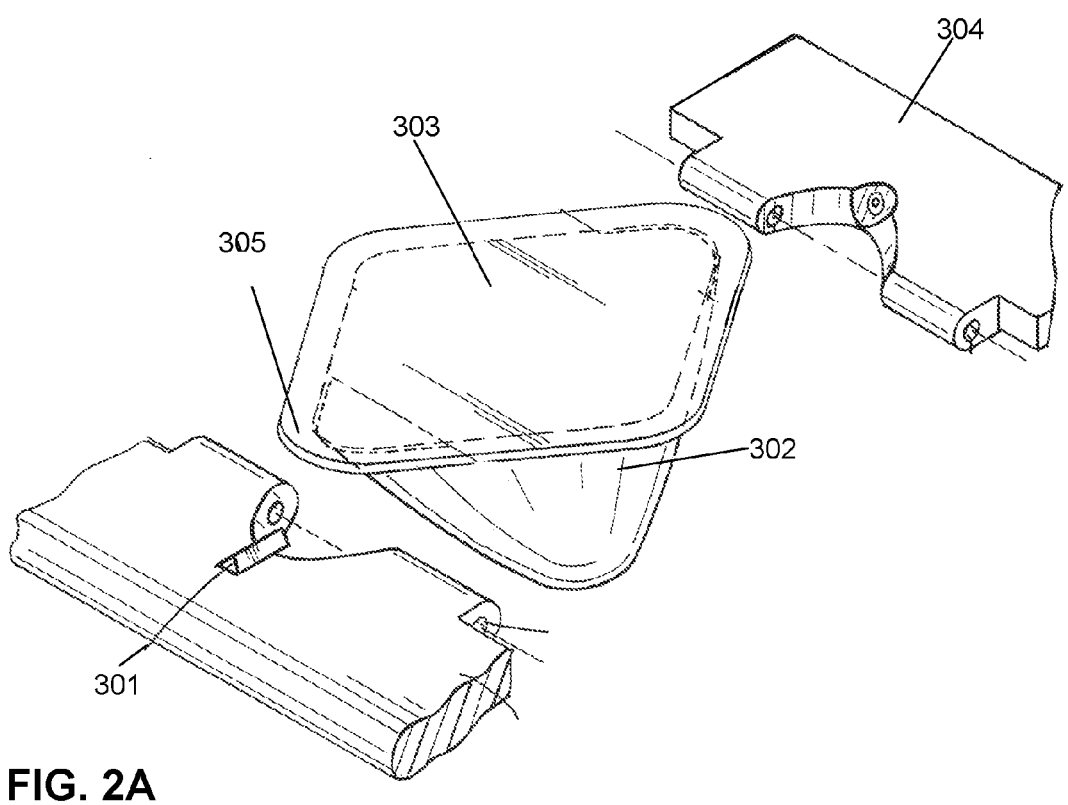
FIGS. 2A and 2B show one embodiment of a typical cold capsule.
Figure 2B:
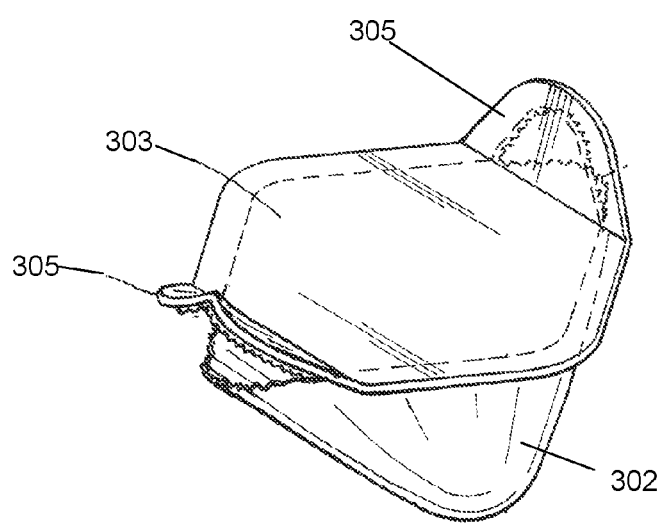

FIG. 2A shows a typical cold capsule (302) with a rim (305) and lid (303). A protrusion (301) pries the rim (305) open when the capsule is forced to rotate downward while being captured with a fixed member (304). FIG. 2B shows the pried open cold capsule (302). While FIG. 2B shows the capsule being opened at both ends, a preferred way of opening the capsule is to open it only at one end. Either opening technique is within the scope of the present invention.

Figure 3:
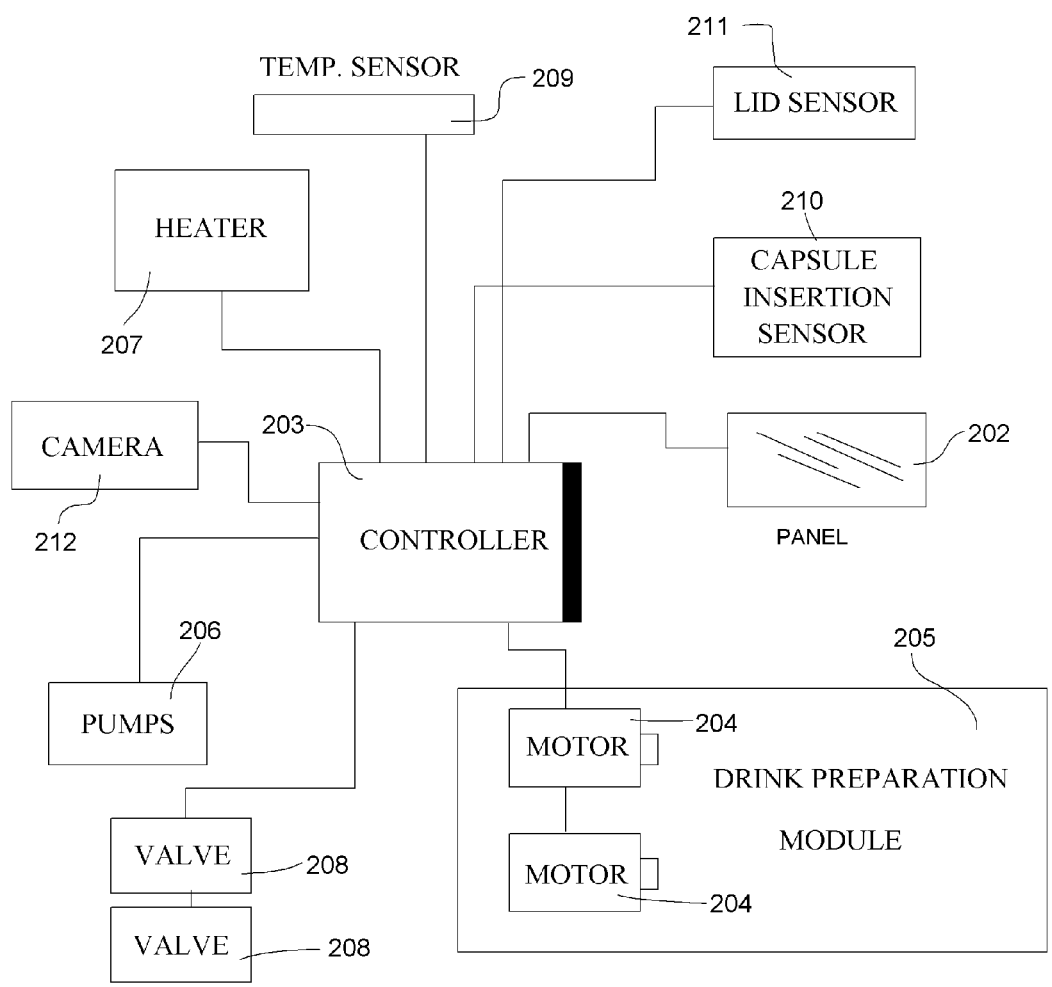
FIG. 3 shows a schematic diagram of the controller and other driven components of the system.

FIG. 3 shows schematically the controller (203) which can be solid state controller chip known in the art. The controller (203) is electrically coupled to the control panel (202) which can be a touch panel, LCD panel or any other control panel of any type. The controller (203) is a processor that executes stored instructions that, in addition to reading and writing the control panel (202) also controls one or more drive motors (204) that are typically part of the mechanical drink preparation module (205). The controller (203) can command the drink preparation module (205) to either prepare and dispense a cold beverage or to prepare and dispense a hot beverage depending upon the user selection. The control panel (202) can display a message to insert the proper capsule in the preparation mechanism and to close the cover. The controller (203) can also receive an instruction about the size of the cup placed under the device and hence provide the correct amount of cold or hot fluid. In some embodiments, the controller (203) receives sensor or camera information as to what type of capsule has been inserted and proceeds to prepare a cold or hot drink. In the case of a camera, the camera can read a label or barcode on the capsule.

Usually, the cold or hot fluid is filtered water; however, it does not have to be water. Other fluids may be used with some drinks. In particular, for some cold drinks, the fluid can be carbonated water. Any fluid is within the scope of the present invention. The controller (203) can also control various pumps (206), heaters (207), and valves (208). In addition, it can read the temperature of the hot injection liquid with a temperature sensor (209). The controller (203) temperature sensor (209) and heater(s) (207) can operate in a closed-loop configuration. Finally, in some embodiments of the present invention, the controller (213) can read a sensor or camera (210) located near the capsule insertion point to determine whether a cold capsule or hot capsule (or any capsule) has been inserted. The sensor (210) may include two or more sensors, one to determine if anything at all has been inserted, and another to determine whether a cold or hot capsule has been inserted. There may be a camera (212) to read a label or barcode on the capsule. These may be infrared LED sensors or any other type of sensor. Further sensors (211) can optionally determine whether the cover is open or closed (seated) and the position of rotating members in the hot/cold dispensing module. If the cover is in the wrong position, the controller (203) can place an error message on the control panel (201).

The actual preparation and dispensing of the cold or hot beverage is handled by an insertable hot/cold dispensing mechanism or module that will now be described in detail.

Hot/Cold Dispensing Mechanism

The present invention deploys an insertable beverage dispensing module or mechanism that can dispense cold beverages using the sealed capsule previously described and can dispense hot beverages using capsules similar to standard capsules known in the art for dispensing coffee. The cold beverage capsules may contain a powder or liquid mix for any cold drink; the hot capsules may contain a powder mix for any hot drink including coffee, tea and hot chocolate, or any other hot drink.

The present invention handles both cold and hot beverages by using an unique mechanism adapted to manipulate both types of capsules. When a cold drink is desired, the user inserts a cold drink capsule into the mechanism and closes the machine lid. The shape of the cold drink capsule, and the manner in which it is seated in the mechanism causes it to be pried open when the lid is closed by being pushed downward against a protruding part as previously described. Cold liquid such as water or other cold liquid can then be injected into the capsule mixing and forcing the contents out and producing a cold drink.

When a hot drink capsule is inserted in the mechanism, closing the machine lid does not open this type of capsule since it is shaped differently. However, it does press the hot capsule down on a bottom puncture needle making a hole in the bottom of the hot capsule. An injection needle arm then rotates from a vertical rest position to a horizontal position over the hot drink capsule causing an injection needle to puncture the top of the capsule. Hot liquid can then be forced or injected into the hot drink capsule under pressure to produce a hot drink. The brewed or mixed hot drink is forced out of the bottom hole or bottom needle to a hot spout from where it flows into a cup.

Figure 4:
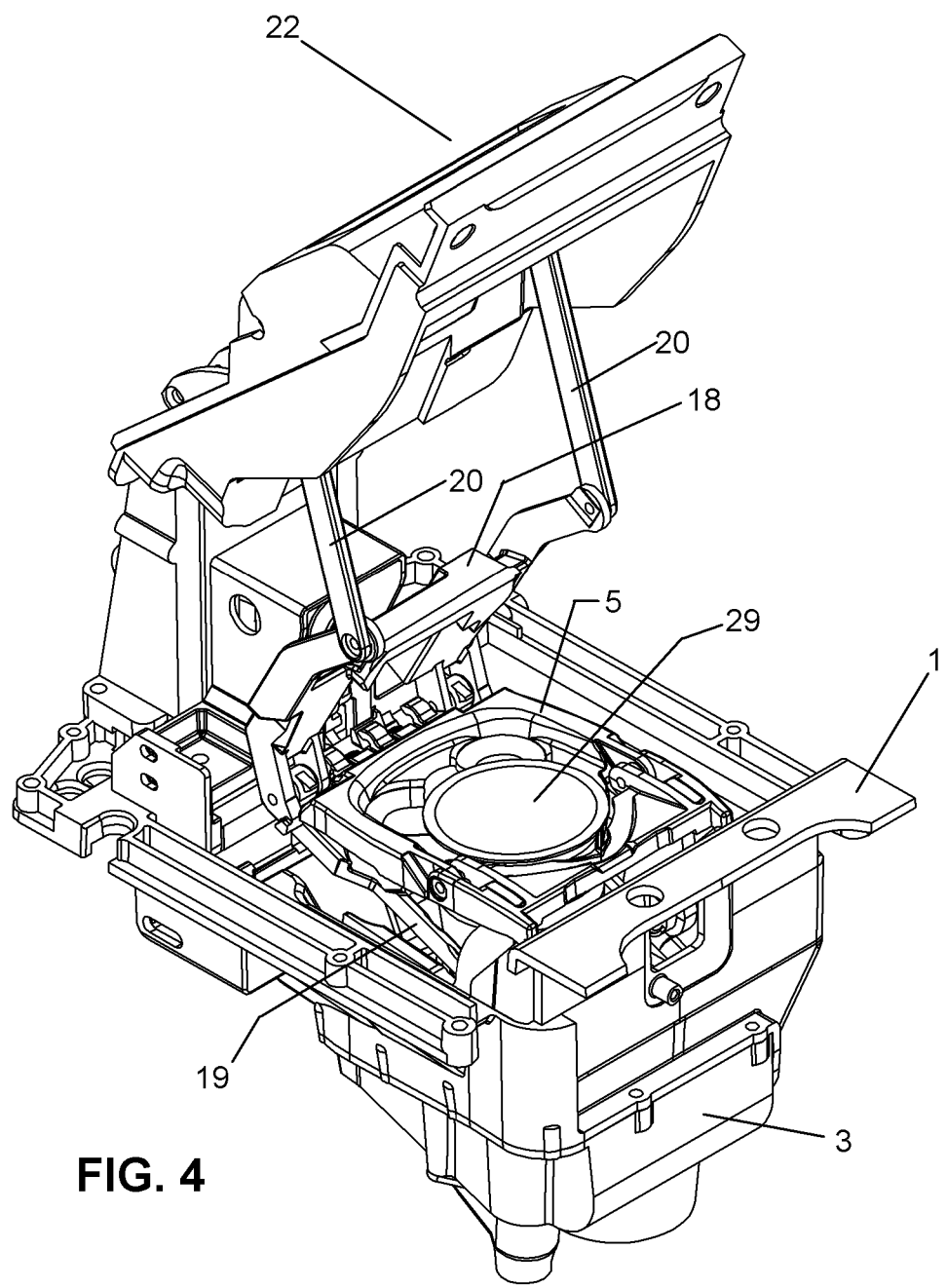
FIG. 4 shows a perspective view of an embodiment of a hot/cold dispensing mechanism.

Turning to FIG. 4, a perspective view of an embodiment of a hot/cold dispensing mechanism can be seen. This mechanism, or head, fits into the drink dispensing machine previously described in place of a cold-drink-only mechanism. The mechanism of FIG. 4 includes an upper housing (1), and a lower housing (3) that are joined to form a single housing. A cover or lid (22) is attached so that it can pivot closed or open on rear pins or hinges. The cover (22) is typically biased closed, but can be easily opened and closed by hand.

The mechanism includes a vertical, substantially cylindrical cavity (29) in its center, that when the cover (22) open, is configured to receive and hold either a cold drink capsule or a hot drink capsule. A small protruding lip or frame (5) allows the capsule to seat snugly, but removably in the cavity (29). The lip (5) also prevents insertion of either type of capsule upside-down. A hot drink capsule is typically taller than a cold drink capsule. It thus sits lower in the cavity (29). This provides a way to identify the difference between the two types of capsules with a sensor, camera or other technique. Also, capsules may have bar codes or other readable indicia indicating what type of capsule they are and what type of drink they contain.

The cover (22) cooperates with the upper housing (1) and is coupled with a pair of links (20) to a ram frame (18) which also pivots downward and is used to force cold drink capsules open in order to open them, and to force hot drink capsules down onto a bottom puncture needle.

Figure 5A:
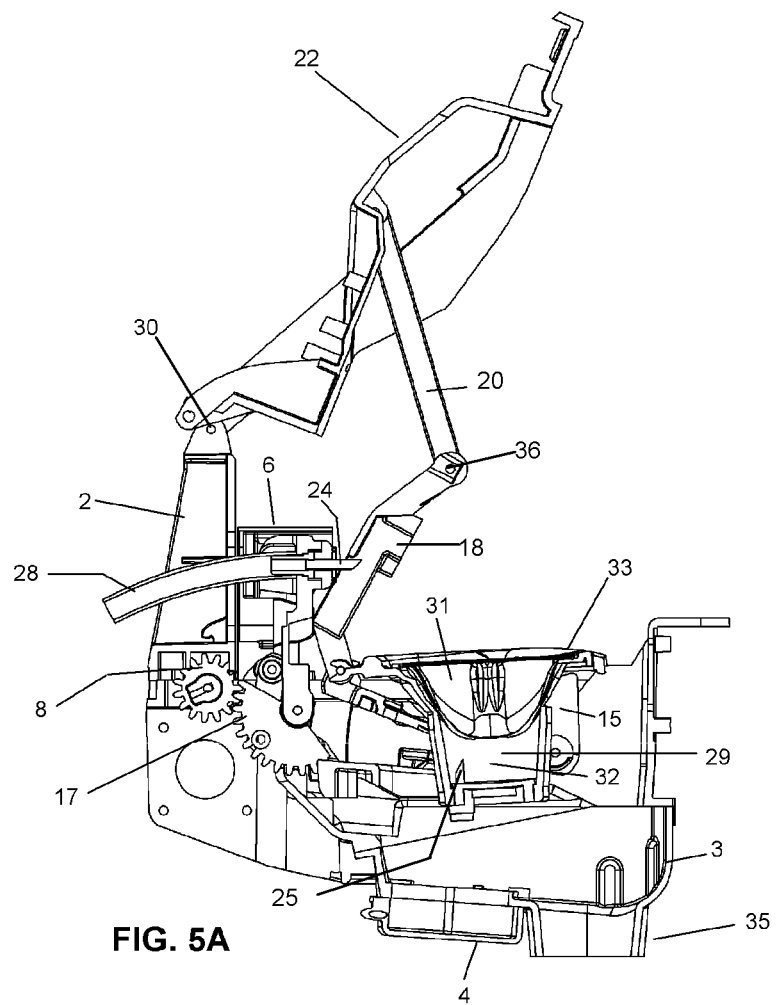
FIG. 5A shows a side sectional view of the hot/cold dispensing mechanism in a neutral or starting configuration with a cold capsule inserted.

FIG. 5A shows a side sectional view of the mechanism of FIG. 4. The cover (22) pivots open and closed on hinge pins (30) on each side that attach the cover (22) to a link base (2). The link base (2) is mounted on the lower housing (3) that provides a pedestal for the cover (22). The cover (22) is coupled with a link bar (20) to the ram frame (18) that also moves downward when the cover (22) is closed. FIG. 5A shows a cold capsule (31) seated in cavity (29). In this case, when the cover (22) is closed by a user, the link bar (20a) forces the ram frame (18) down on to the cold capsule (31). The cold capsule (31) moves downward and rotates against a protrusion (shown in FIG. 2A), and is forced open.

It can be seen in FIG. 5A, that the cavity (29) is not simply cylindrical, but has a lower cylindrical part (32) and a tapered, conical upper part (33). The upper part (33) is adapted to receive and hold a cold capsule of the type previously discussed. The lower substantially cylindrical part (32) is adapted to receive and hold a hot capsule, which being of smaller diameter and different shape from the cold capsule, seats lower than a cold capsule. The bottom of the cavity (29) has a vertical needle (25) used to puncture the bottom of a hot capsule when the machine cover (22) is closed.

Figure 5B:
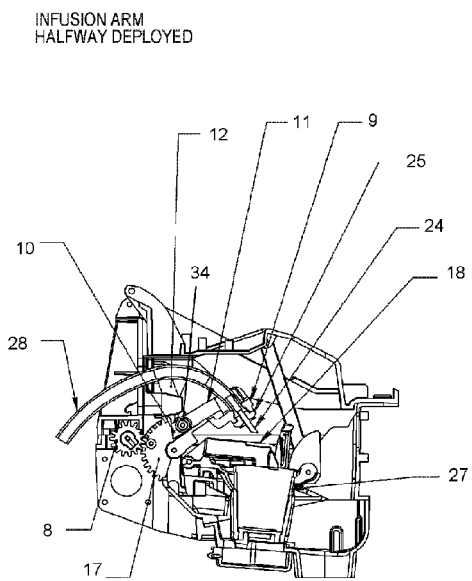
FIG. 5B shows a side section view of the hot/cold dispensing mechanism with a hot capsule inserted and the injection needle half-way deployed.
Figure 5C:
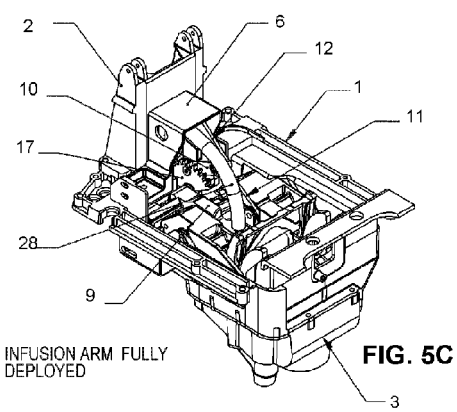
FIG. 5C shows a perspective view of the mechanism of FIG. 2B with the injection needle fully deployed.

When a hot capsule is used, after the cover (22) is closed and the bottom of the hot capsule has been punctured, an injection needle arm rotates from a stationary vertical position to a horizontal position over the hot capsule which causes an injection needle (24) to punctures the top of the hot capsule. This can be seen in FIGS. 5B-5C. In FIG. 5A, the injection needle (24) can be seen attached to an injection hose (28) in a horizontal or rest position. This is its starting or rest position where the injection needle arm (9) is in the vertical position. FIG. 5B is a side sectional view of the mechanism with a hot capsule inserted and the injection needle (24) half-way deployed. FIG. 5C is a perspective view of the mechanism with the injection needle (24) fully deployed and sealed against the top of the hot capsule.

Turning to FIG. 5B, the injection arm (9) can be seen attached with a first drive link (10) and second drive link (11) through a pivot (34). An injection arm (9) is attached to a partial gear (17). When the partial gear (17) is caused to rotate through an angle, the injection needle (24) rotates continuously from the rest position shown in FIG. 5A to a final position shown in FIG. 5C where it has punctured the hot capsule. FIG. 5B shows the injection needle (24) half-way through the rotation cycle. The partial gear (17) is driven with a smaller drive gear (8) that is coupled to a drive motor (not shown). As the motor rotates the drive gear (8), the partial gear (17) makes a partial rotation causing the injection needle arm (9) to move from the vertical position to a horizontal position over the hot capsule (27) causing the injection needle (24) to puncture the hot capsule top.

FIG. 5C shows a top-side perspective view of the mechanism with the injection needle (24) fully deployed. In this configuration, the injection needle (24) has punctured the hot capsule, and hot liquid can be injected into the capsule through the injection hose (28). The mechanism that drives the injection needle includes a link base (2) and an armature mount (6) which provide support for the injection needle rotation sub-system. The first drive link (10) can be seen attached to the partial gear (17). The injection arm (9) is attached to the partial gear (17) (shown in FIG. 5B). It can be seen in FIG. 5C that the partial gear (17) and hence the drive gear (shown in FIG. 5B) are located laterally at the approximate center of the assembly.

Figure 5D:
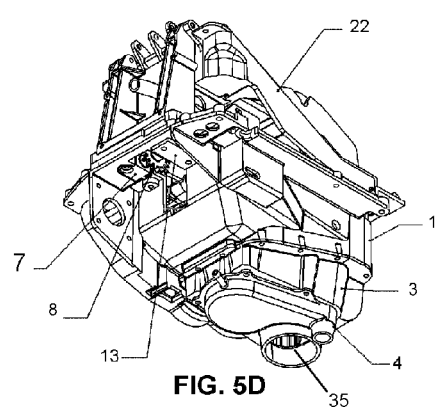
FIG. 5D shows a bottom perspective view of the hot/cold mechanism.

Turning to FIG. 5D, a bottom perspective view of the mechanism can be seen with the cover (22) in the closed configuration. The lower housing (3) is attached to the upper housing (1), and the cover (22) pivots between an open and closed position. The closed position is shown in FIG. 5D. On the bottom of the assembly, a hot spout (4) and a cold beverage orifice (35) can be seen. At the lower back of the assembly, there is a motor mount (13) that holds the drive motor (not shown). The drive motor directly drives the drive gear (8) which is coupled to the partial gear (shown in FIG. 5C). A mounting bracket (7) is used to mount the drive gear (8).

As previously stated, the present invention can dispense both cold and hot beverages. The sequential process employed for both situations will now be examined step-by-step.

Cold Beverage Dispense

Returning to FIG. 5A, the dispensing mechanism can seen in section in a static or resting configuration with the cover (22) open. The cover (22) is coupled to the ram frame (18) through a link bar (20) The ram frame (18) is fully raised. A cold capsule (31) of the type previously described is shown inserted into the dispensing cavity (29). The cold beverage capsule (31) has a rim that allows it to seat high in the cavity (29) which in the partially conical upper region (33).

Figure 6:
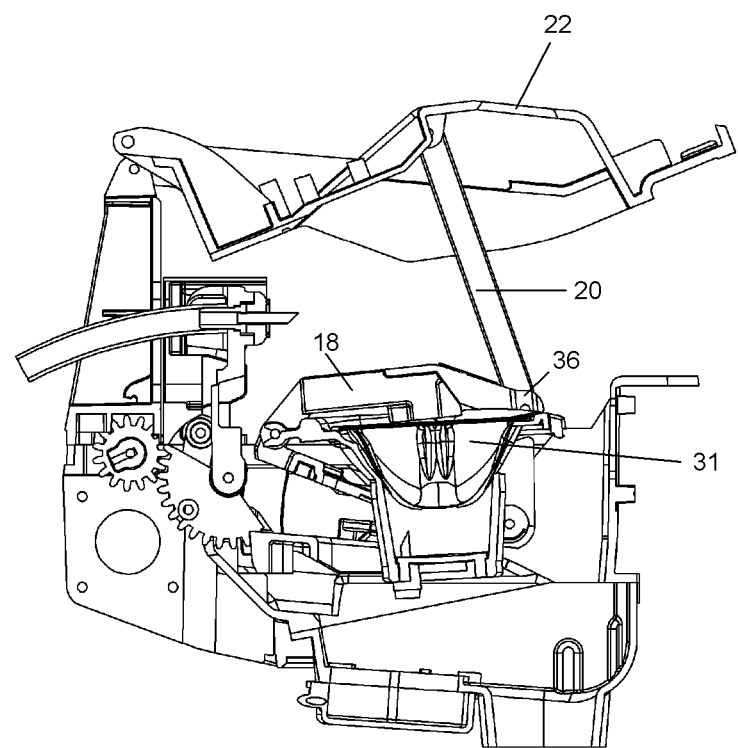
FIG. 6 shows a side sectional view of the hot/cold mechanism with the cover partly closed.

FIG. 6 shows the mechanism as the user is closing the cover (22). The cover's downward travel has caused the ram frame (18) to pivot downward onto the capsule (31) through the action of the two link bar (20) and the pivot (36) capturing the capsule.

Figure 7:
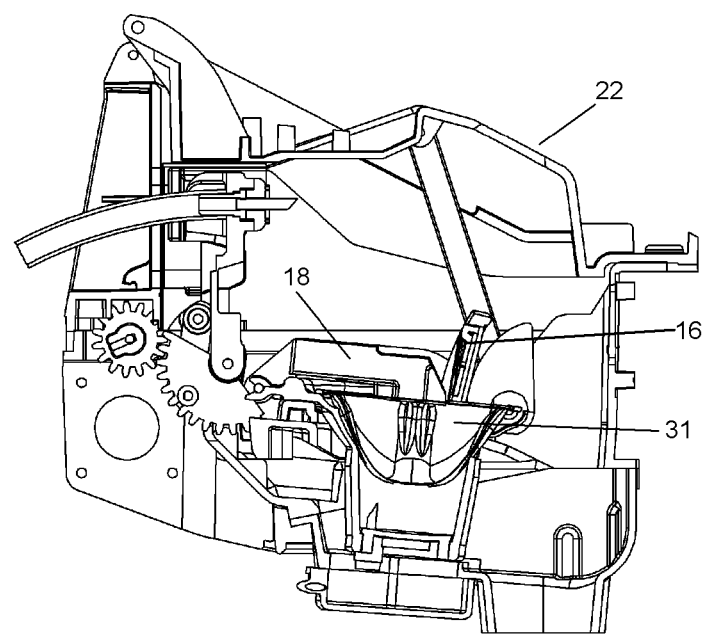
FIG. 7. shows a side sectional view of the hot/cold mechanism with the cover completely closed.

FIG. 7 shows the mechanism as the user finally pushes the cover (22) totally closed. This final push causes the cold capsule (31) to pry open along a scored seam on its rim or directly below its rim because the outer edge of the capsule rim abuts a protrusion (shown in FIG. 2A) as the capsule body is pressed downward as has been previously described. The pod frame (16) is a rotating member that pries the cold capsule into an open configuration.

Figure 8:
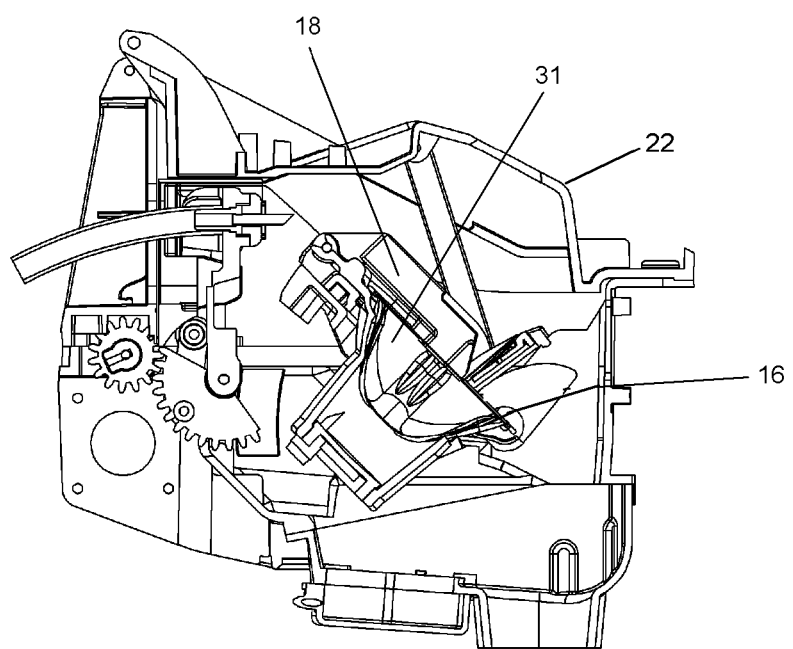
FIG. 8 shows a side sectional view of the hot/cold mechanism with the cover completely closed as the pouring frame begins to rotate the cold beverage capsule.

FIG. 8 shows the mechanism after the cover (22) is closed and the cold capsule (31) has been torn open. The entire pod frame (16) along with the ram frame (18) rotates forward to prepare for dispensing the cold beverage. A motor, typically a stepper motor, and other drive gears (not shown) rotate the cold capsule (31) into an emptying position.

Figure 9:
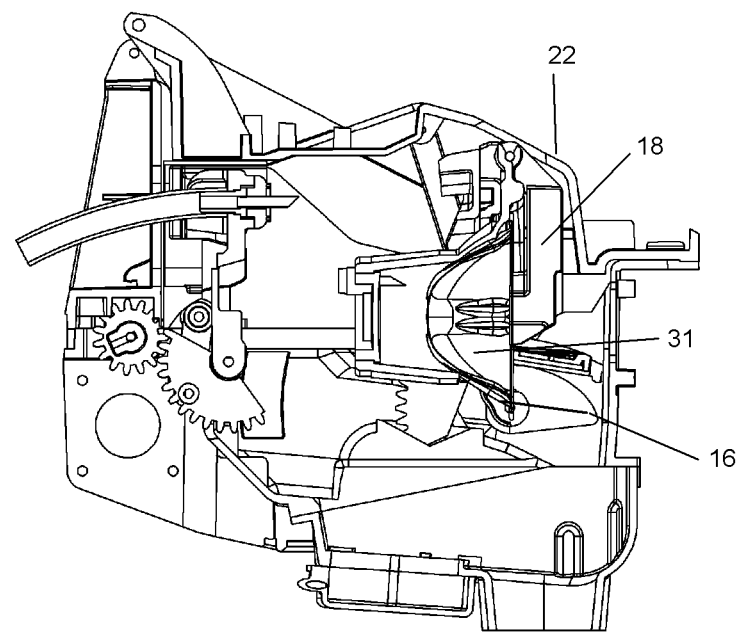
FIG. 9 shows a side sectional view of the hot/cold mechanism with the cover completely closed with the pouring frame at the maximum rotated position.

FIG. 9 shows the mechanism after the pod frame (16) has completely rotated the cold capsule. This is the cold beverage dispense configuration where contents of the cold capsule (31) are dispensed when a stream of cold liquid such as water is injected into the body of the cold capsule (31). The ready-to-drink cold beverage dispenses out of the bottom of the assembly through an orifice directly into a cup through a cold drink exit orifice (35).

After the cold beverage is dispensed, the system rotates back to the original neutral position. The user can dispose of the spent cold capsule (31) upon opening the cover (22). In some embodiments, an additional mechanism (not shown) forces the spent cold capsule (31) into a disposal area.

Hot Beverage Dispense

Figure 10:
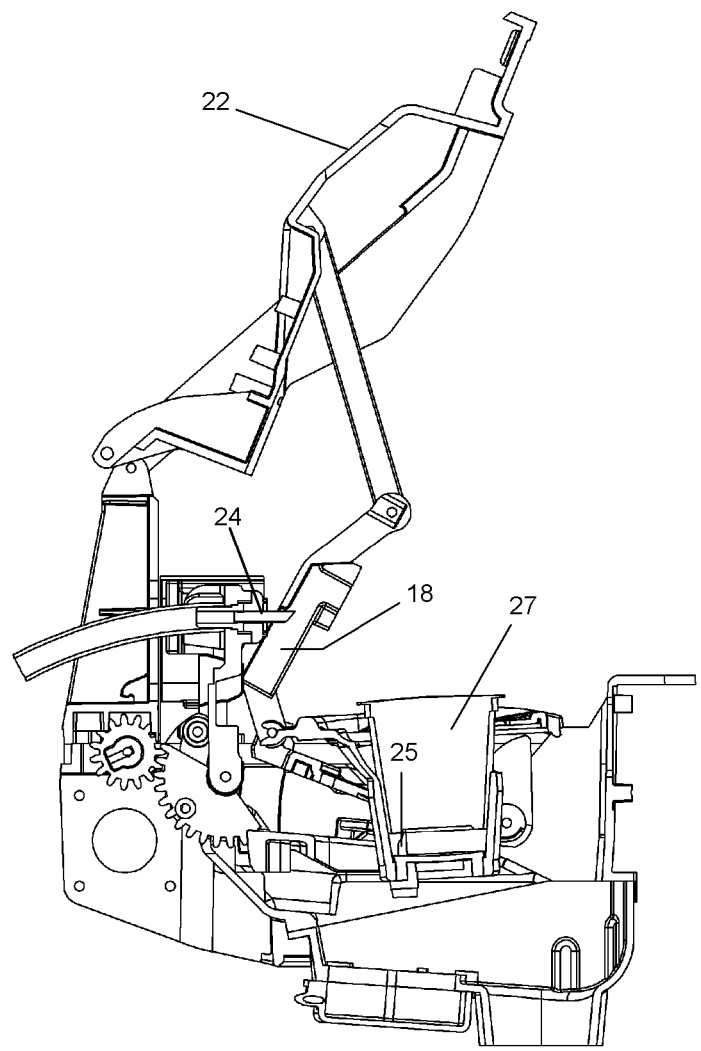
FIG. 10 shows a side sectional view of the hot/cold mechanism with the cover open in the neutral configuration with a hot beverage capsule or k-cup inserted.

FIG. 10 shows a side sectional view of the mechanism with the cover (22) completely open and a hot beverage capsule (27) inserted into the cavity (29) Since the hot capsule (27) is more nearly cylindrical than the cold capsule (although slightly conical), its rim does not extend out as far as the rim on a cold capsule, and it tends to seat lower in the cavity (29). There is a bottom needle (25) under the hot capsule (27) that will puncture the bottom of the hot capsule when the cover (22) is fully closed. The injection needle (24) is in a neutral or rest position, and the ram frame (18) is raised.

Figure 11:
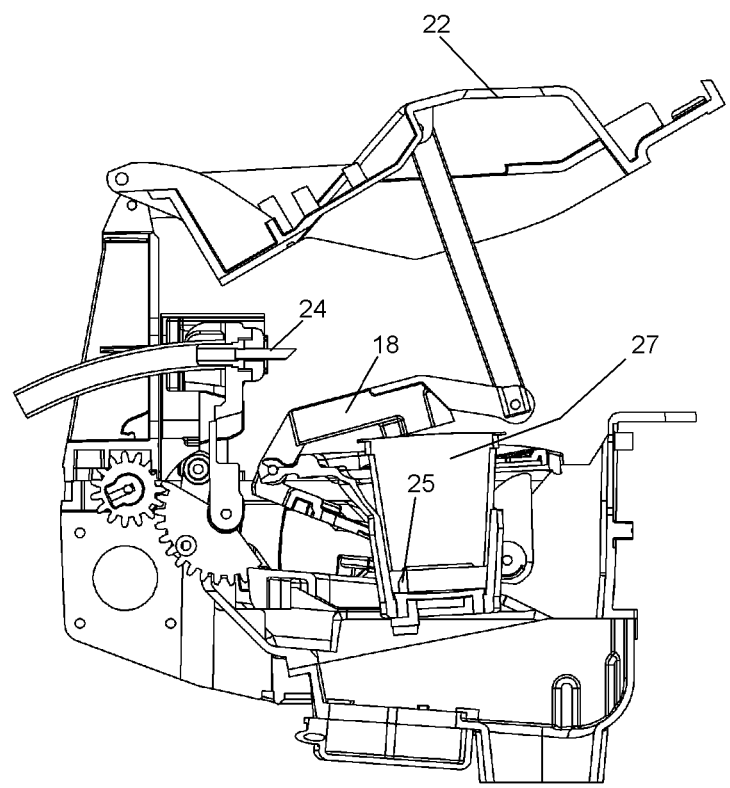
FIG. 11 shows a side sectional view of the hot/cold mechanism with the cover partially closed and the hot capsule sitting on the bottom needle.

FIG. 11 shows the mechanism as the user closes the cover (22). The ram frame (18) has rotated downward in response to the linkage (20) and rests on top of the hot capsule (27) capturing it. The hot capsule (27) is sitting on the bottom needle (25), but the bottom needle has not yet pierced the capsule.

Figure 12:
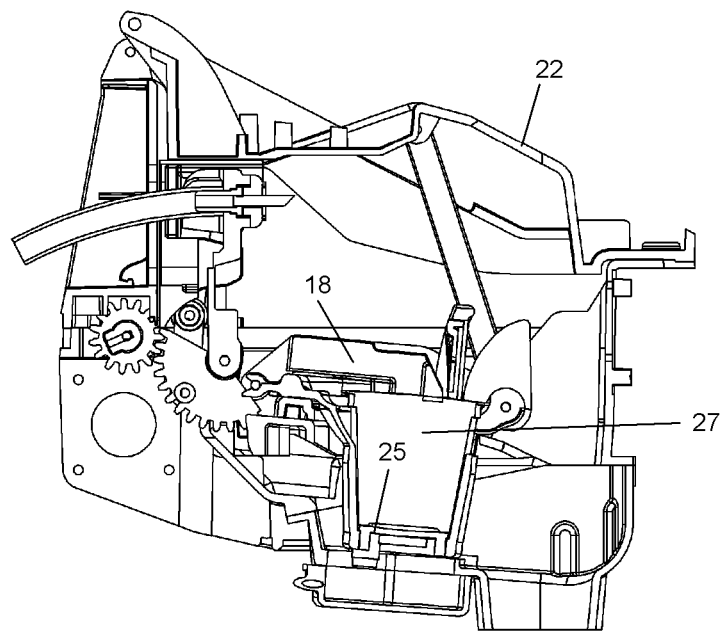
FIG. 12 shows a side sectional view of the hot/cold mechanism with the cover totally closed so that the bottom needle has punctured the bottom of the hot capsule.

FIG. 12 shows the mechanism with the cover (22) completely closed. The force of closing the cover has caused the ram frame (18) to press the capsule (27) down onto the bottom needle (25) forcing the bottom needle to puncture the bottom of the capsule (27). The system is ready to brew the hot beverage.

Figure 13:
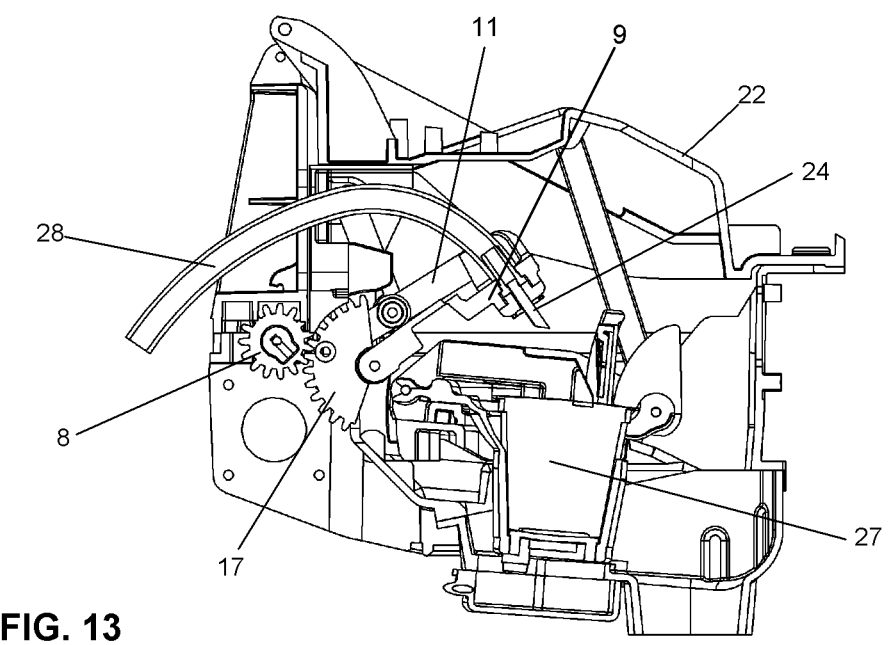
FIG. 13 shows a side sectional view of the hot/cold mechanism with the cover totally closed while the injection needle rotates over the hot capsule.

FIG. 13 shows the next step as the drive motor (not shown) begins to turn the drive gear (8) which turns the partial gear (17). This causes the injection arm (9) to pivot forward bringing the injection needle (24) toward the top of the hot capsule (27).

Figure 14:
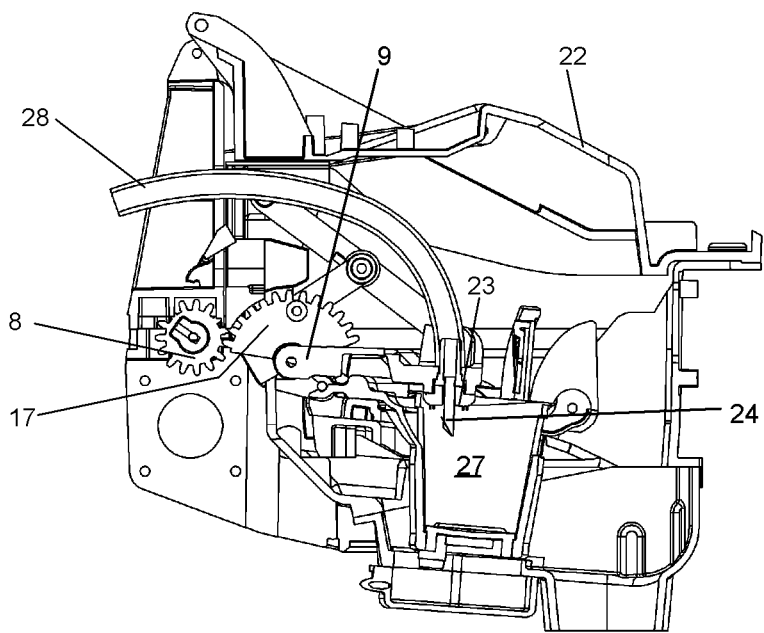
FIG. 14 shows a side sectional view of the hot/cold mechanism with the cover totally closed and the injection needle piercing the top of the hot capsule.

FIG. 14 shows the injection needle (24) piercing through the top of the hot capsule (27) as the injection arm has reached its lowest position. The drive gear (8) and partial gear (17) have reached the end of their allowed rotation and have stopped. Hot liquid may now be injected under pressure into the hot capsule (27) through the injection needle (24). An injection needle seal (23) seals the injection needle (24) to the top of the hot capsule (27) preventing leakage during the injection. The hot drink now brews or mixes. It is forced out through the hole in the bottom of the hot capsule and is dispensed into a cup through a hot spout (4) (shown in FIG. 5D and FIG. 20).

After the hot beverage is dispensed, the user (or the next user) can dispose of the spent hot capsule (24) after opening the cover (22).

Views of Outside of Hot/Cold Dispense Mechanism

Figure 15:
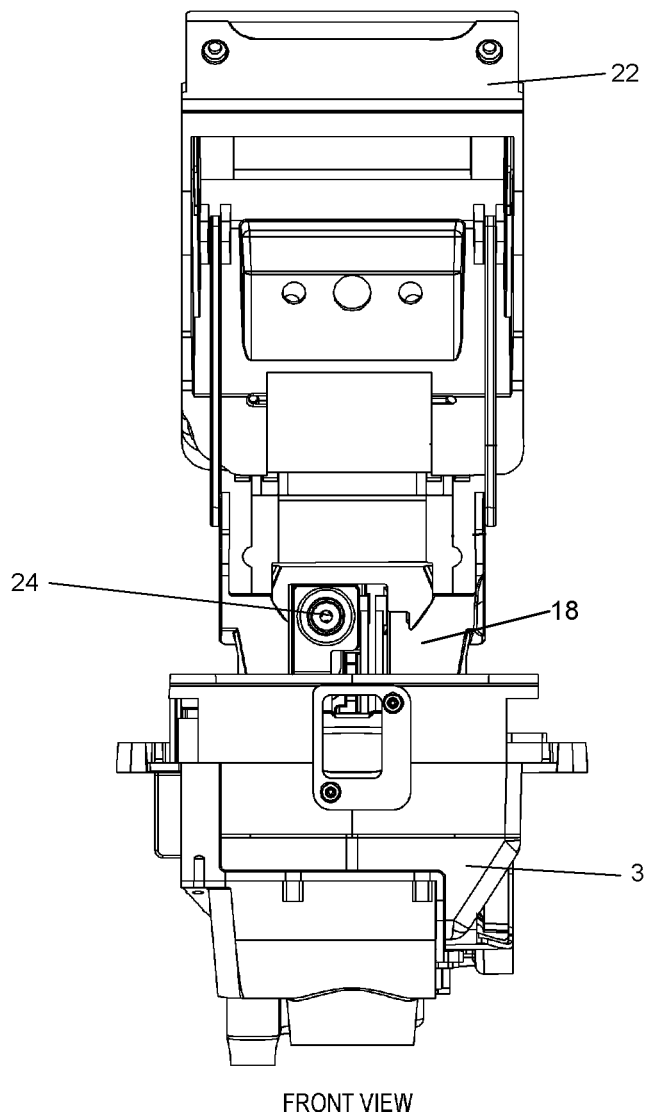
FIG. 15 shows a front view of the hot/cold mechanism.
Figure 16:
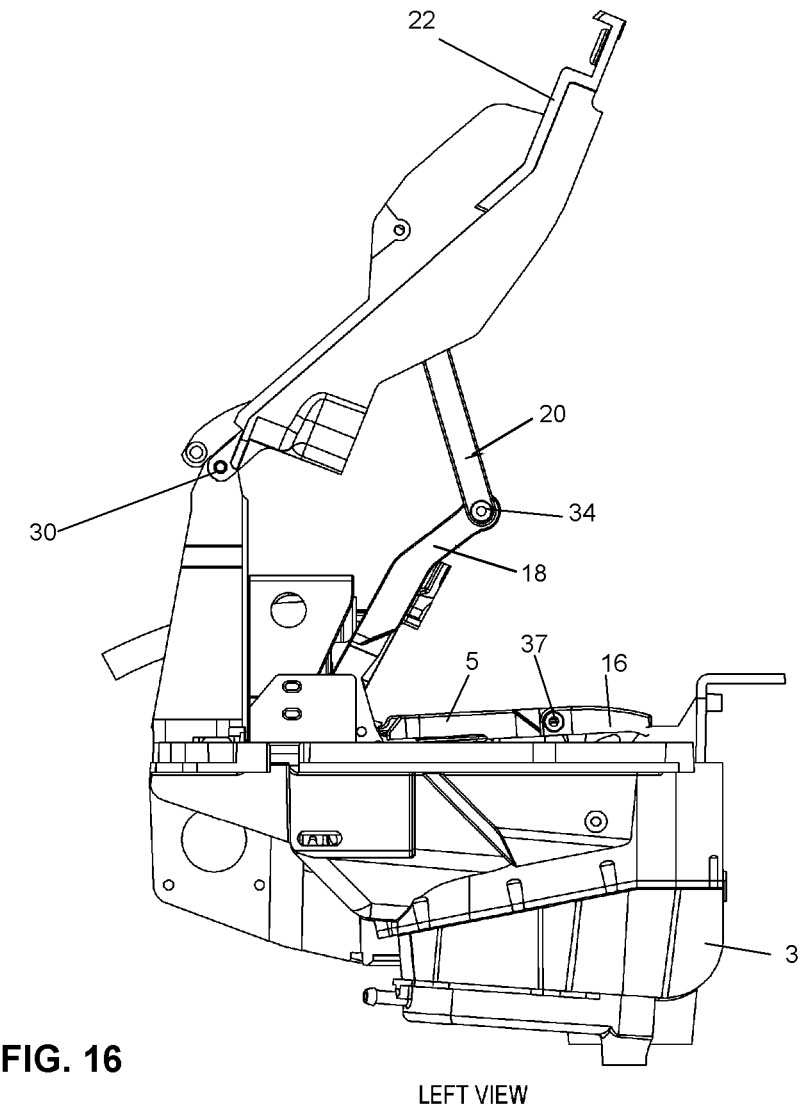
FIG. 16 shows a left view of the hot/cold mechanism.
Figure 17:
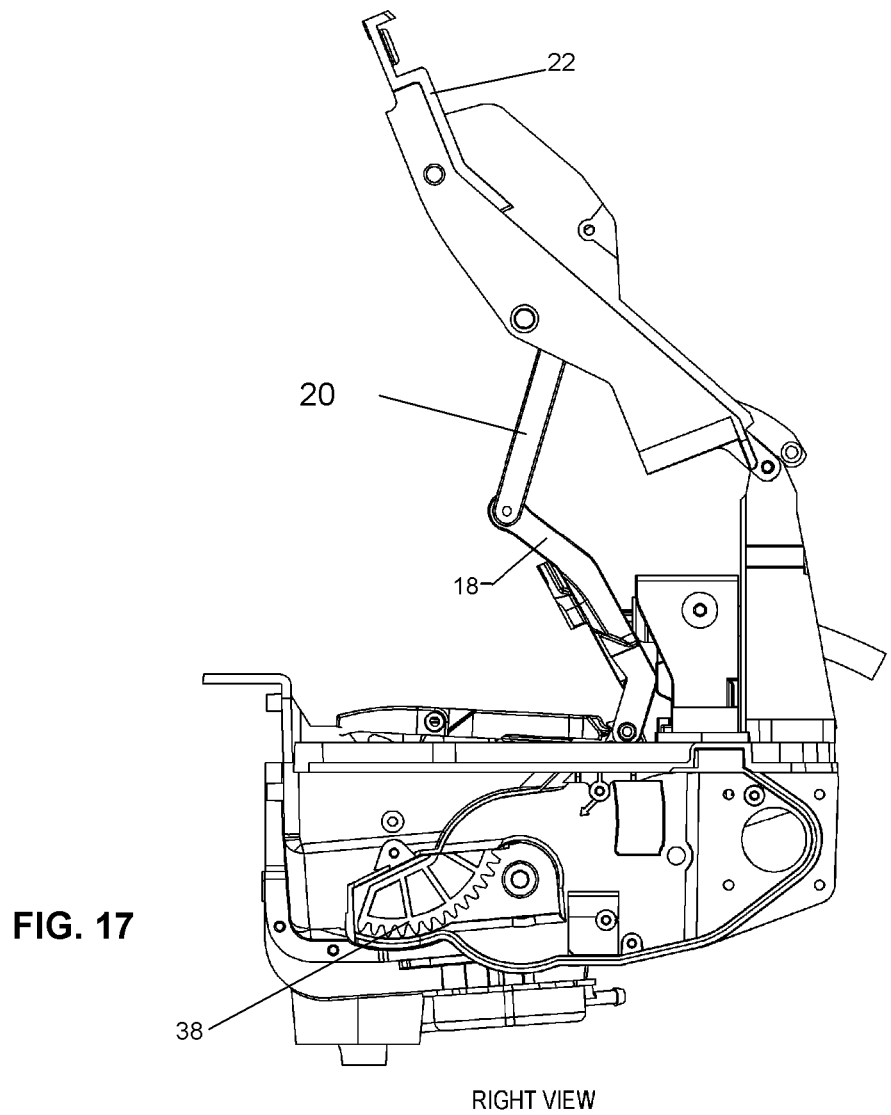
FIG. 17 shows a right view of the hot/cold mechanism.
Figure 18:
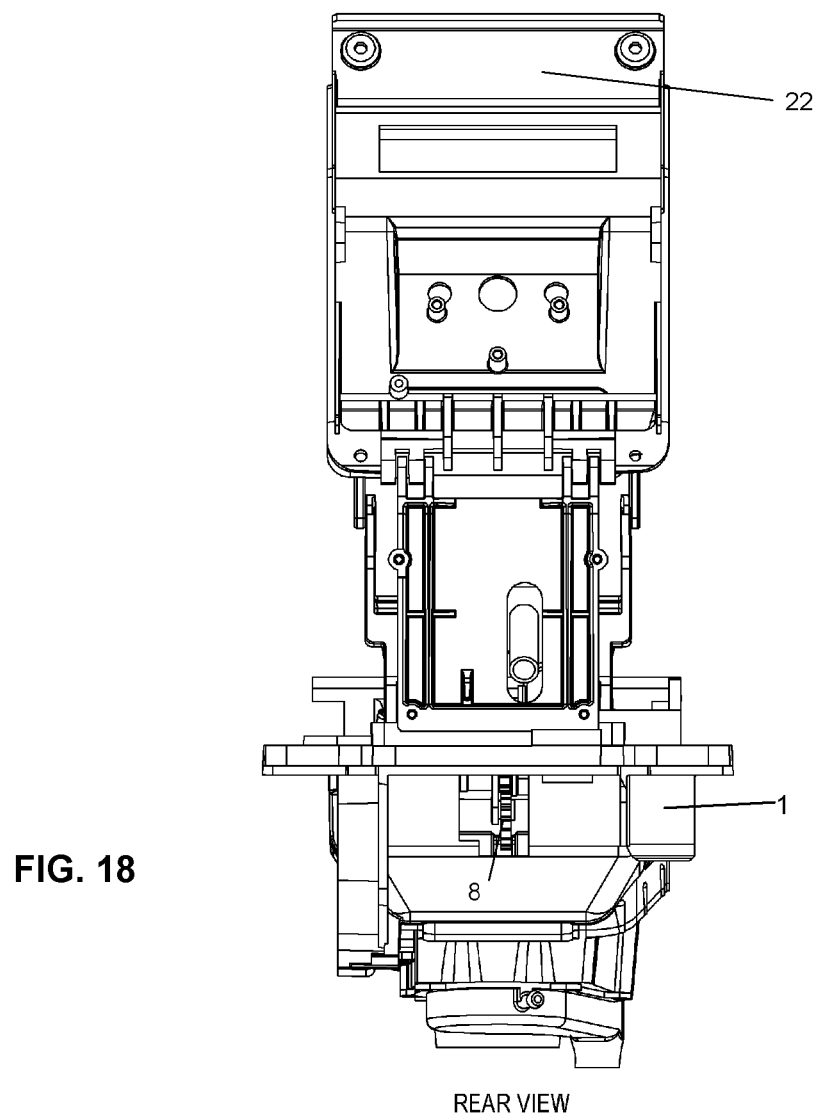
FIG. 18 shows a rear view of the hot/cold mechanism.
Figure 19:
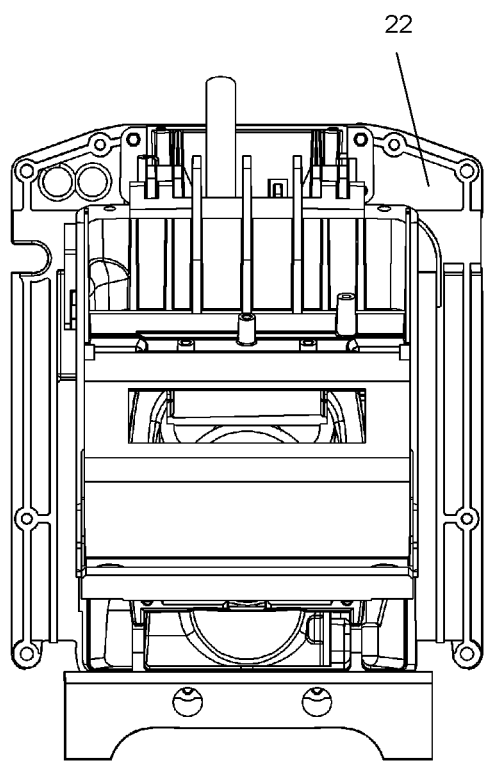
FIG. 19 shows a top view of the hot/cold mechanism.
Figure 20:
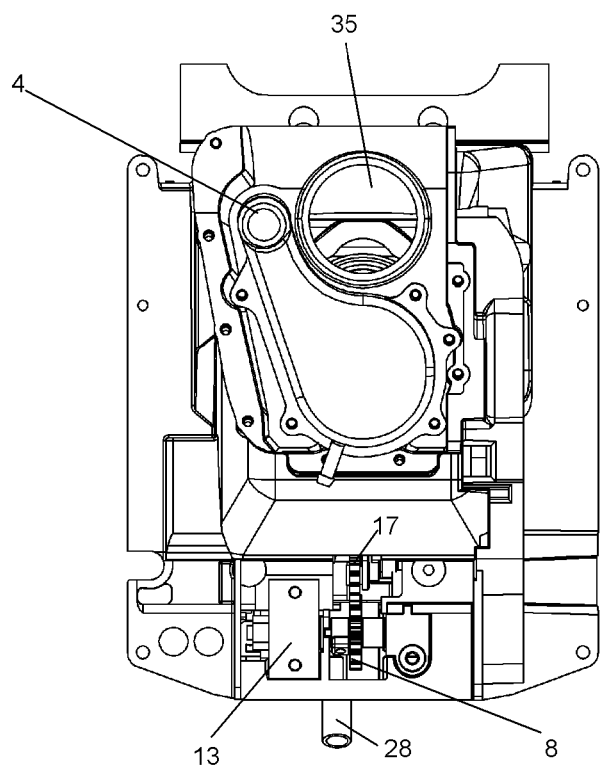
FIG. 20 shows a bottom view of the hot/cold mechanism.

FIGS. 15, 16, 17, 18, 19 and 20 show the outside of the hot/cold dispense mechanism from each primary direction. FIG. 15 shows a front view. FIG. 16 shows a left view. FIG. 17 shows a right view. FIG. 18 shows a rear view. FIG. 19 shows a top view. FIG. 20 shows a bottom view.

Turning to FIG. 15, a front view of the hot/cold mechanism is seen. The cover (22), ram frame (18) and injection needle (24) are visible. The cover (22) is shown in the open position.

FIG. 16 shows a left view of the mechanism. The cover (22), link (20) and pivot (34) can be seen. The pin hinge (30) allows the cover (22) to pivot. The opening frame (5) and the opening pod frame (16) are also visible. To open the cold capsule, or press the hot capsule down on the bottom needle, the opening pod frame (16) rotates from the horizontal position shown in FIG. 16 to a vertical position. The rotation is around a pin (37).

FIG. 17 shows a right view of the mechanism. Again, the cover (22) and link (20) can be seen. A special partial gear assembly (38) driven with a different motor causes the pod frame (16) to rotate as has been discussed in order to allow the contents of a cold capsule to be dispensed.

FIG. 18 shows a rear view of the mechanism. Here the cover (22) is seen from the back side and closes downward and away from the point of view. The injection needle drive gear (8) can be seen through a slot in the rear of the lower housing.

FIG. 19 shows a top view that mostly includes the cover (22), while FIG. 20 shows a bottom view. The hot spout (4) and the cold orifice (35) can be seen. Also, in the rear of the unit is the drive motor mount (13), the injection needle drive gear (8) and the partial gear (17). Finally, the injection hose (28) can be seen exiting the top rear of the housing.

Figure 21:
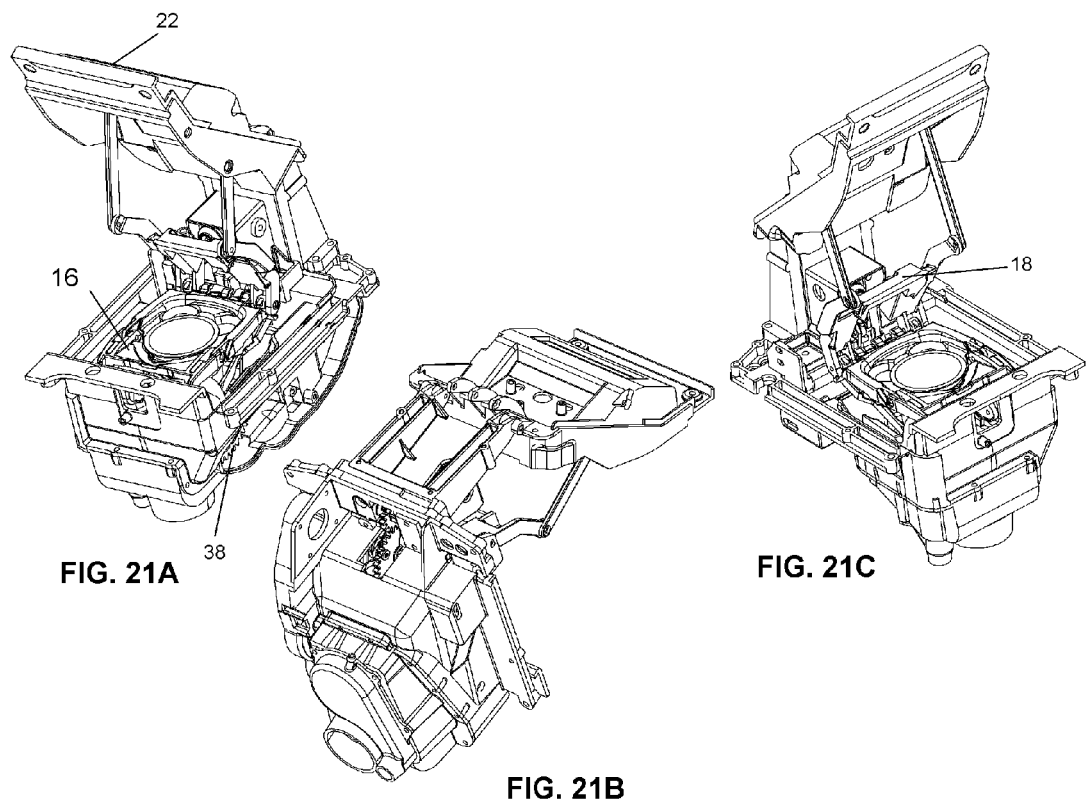
FIGS. 21A, 21B and 21C show three isometric view of the hot/cold mechanism in different positions.

FIGS. 21A-21C show three perspective views of the mechanism in three different positions. Most of the features previously described can be seen. Of particular interest is the pod frame (16) that rotates to open the cold capsule while the ram frame (18) acts to restrain the it. A lower pouring frame holds the cold drink parts. This lower pouring frame is driven by the lower gear (38) to rotate forward to allow the cold beverage to dispense. The upper pouring frame (19) rotates to seat either type of capsule.

Particular embodiments of the present invention can be equipped with a sensor that determines whether a cold capsule or a hot capsule has been inserted into the mechanism (or that anything has been inserted). This sensor can be coupled to the controller so that if the user has inserted the wrong type of capsule for his or her selection, the machine can display an error message and not actually dispense the beverage or cause deployment of the injection needle onto a cold capsule. In the case of an error, the user can be given a chance to either remove mis-inserted capsule and discard it, or to correct his or her selection to match the inserted capsule. Because when the cover (22) is completely closed, a cold capsule has been torn open, or the bottom needle has penetrated a hot capsule, it is not possible to remove a mis-inserted capsule and use it later. If it is removed, it should be discarded.

In a different embodiment of the present invention, the hot dispensing is configured so that the top of the hot capsule is punctured by the inlet needle before the bottom is punctured by the outlet needle.

Figure 22:
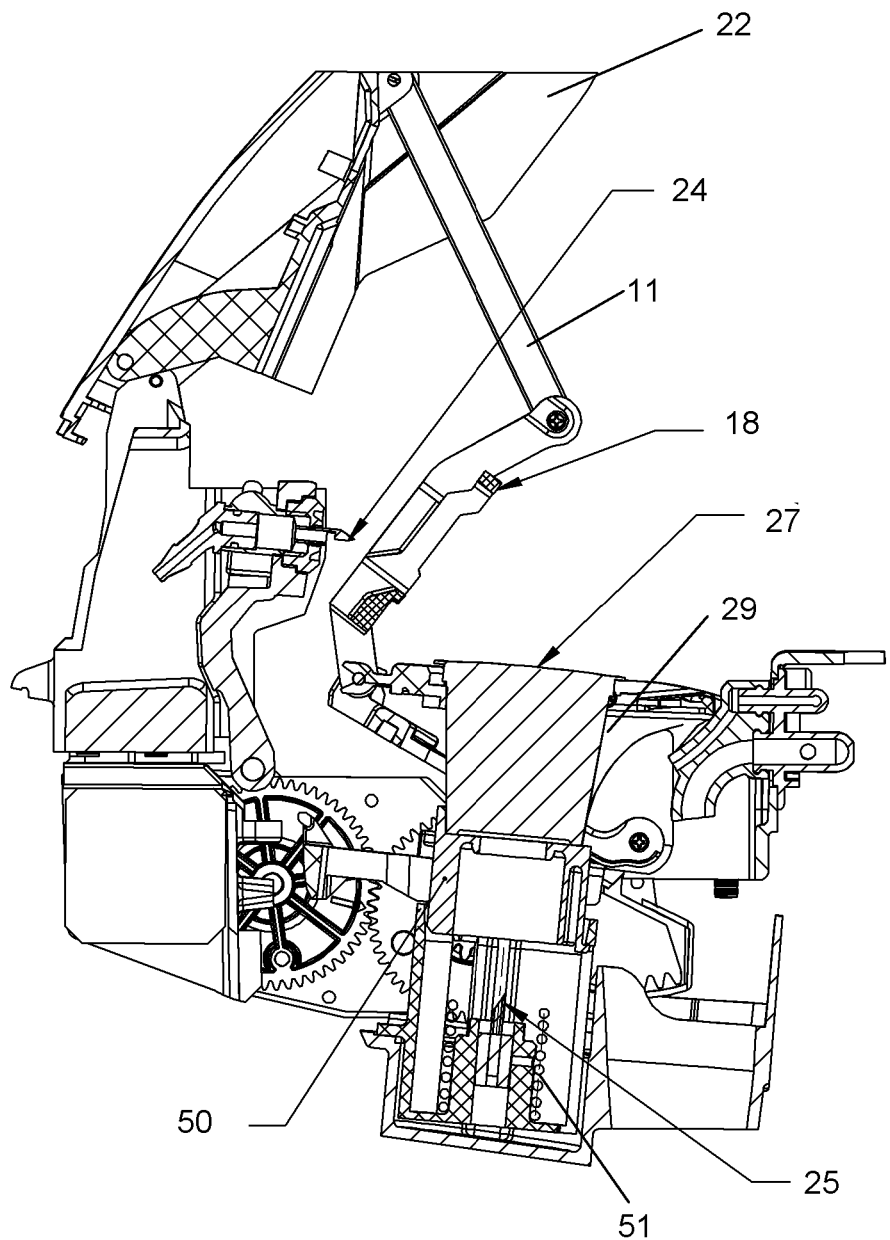
FIG. 22 shows a cross-section of an alternate embodiment of the present invention where the top of a hot capsule is pierced before the bottom.

Turning to FIG. 22, a cross-section of this embodiment may be seen. The hot capsule (27) is seated in cavity (29) in a manner similar to previously-described embodiments. The capsule (27) sits on a carrier (50) that is spring-loaded upward by a carrier spring (51). The cover (22) is open. An outlet needle (25) is located under the capsule (27). An inlet injection needle (24) is shown in a retracted position away from the capsule (27).

Figure 23:
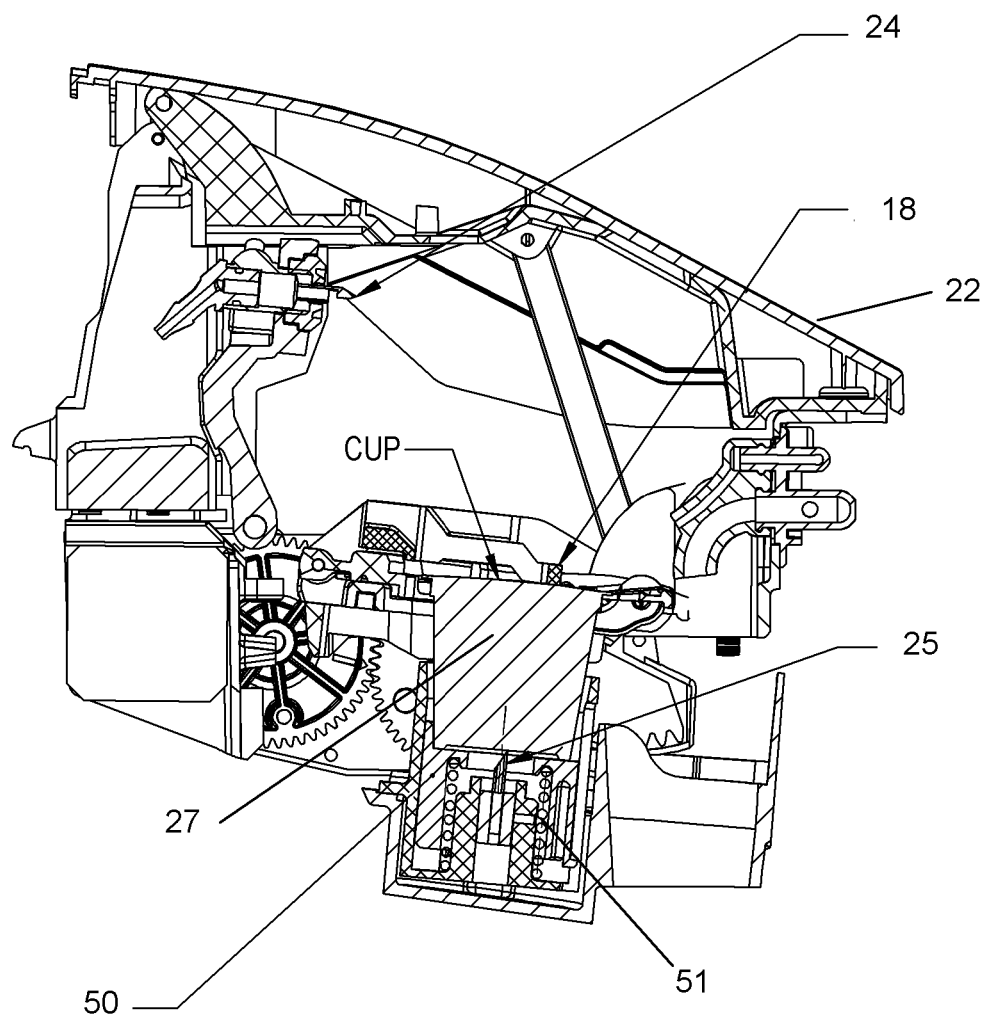
FIGS. 23-27 show the sequence of events during the dispensing of a hot beverage with the embodiment of FIG. 22.

FIGS. 23-27 show the sequence of preparing and dispensing a hot drink. In FIG. 23, the cover (22) has been closed. A ram frame (18) forces the cup carrier (50) and capsule (27) partially downward against the carrier spring (51). The outlet needle (25) remains below the capsule (27) and does not puncture the capsule.

Figure 24:
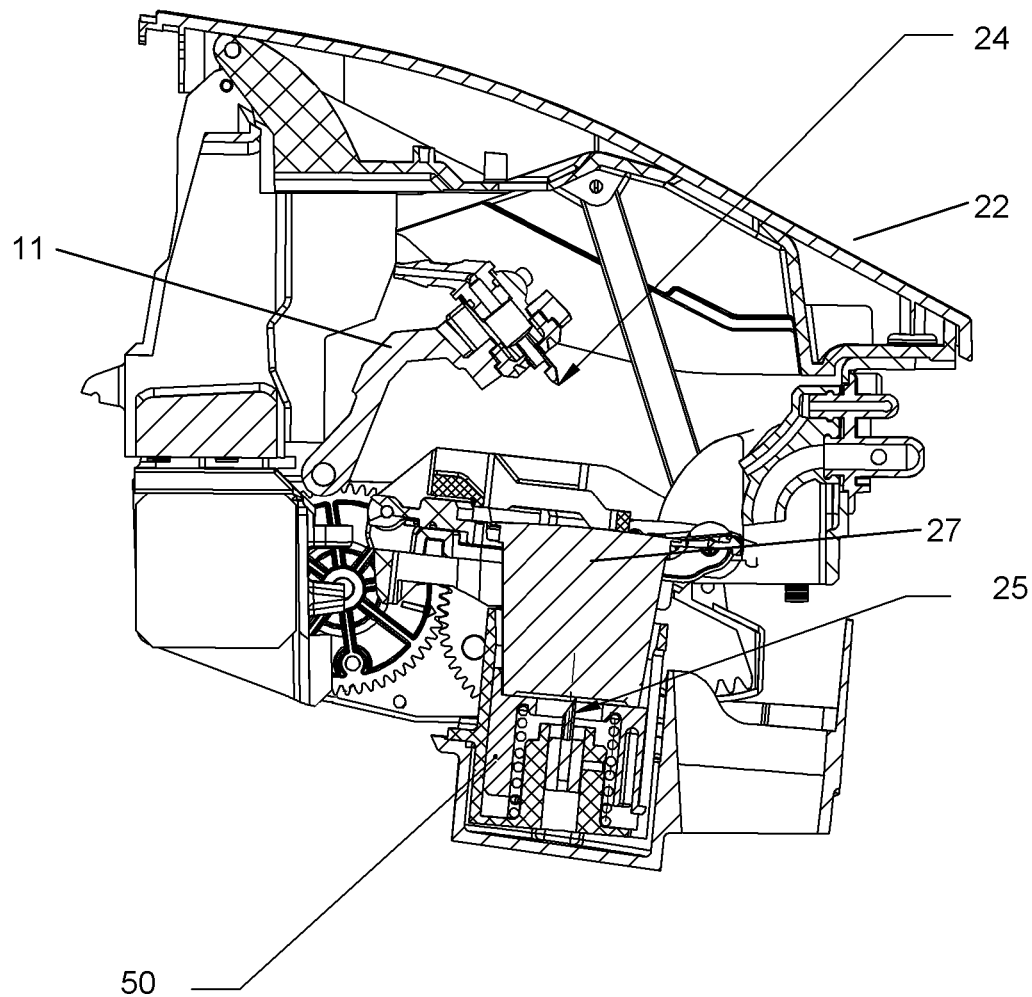

In FIG. 24, a motor-driven arm (11) begins to rotate the inlet injection needle (24) toward the top of the capsule, while the outlet needle (25) continues to remain below the capsule (27). The arm (11) is driven by gears which are coupled to a motor.

Figure 25:
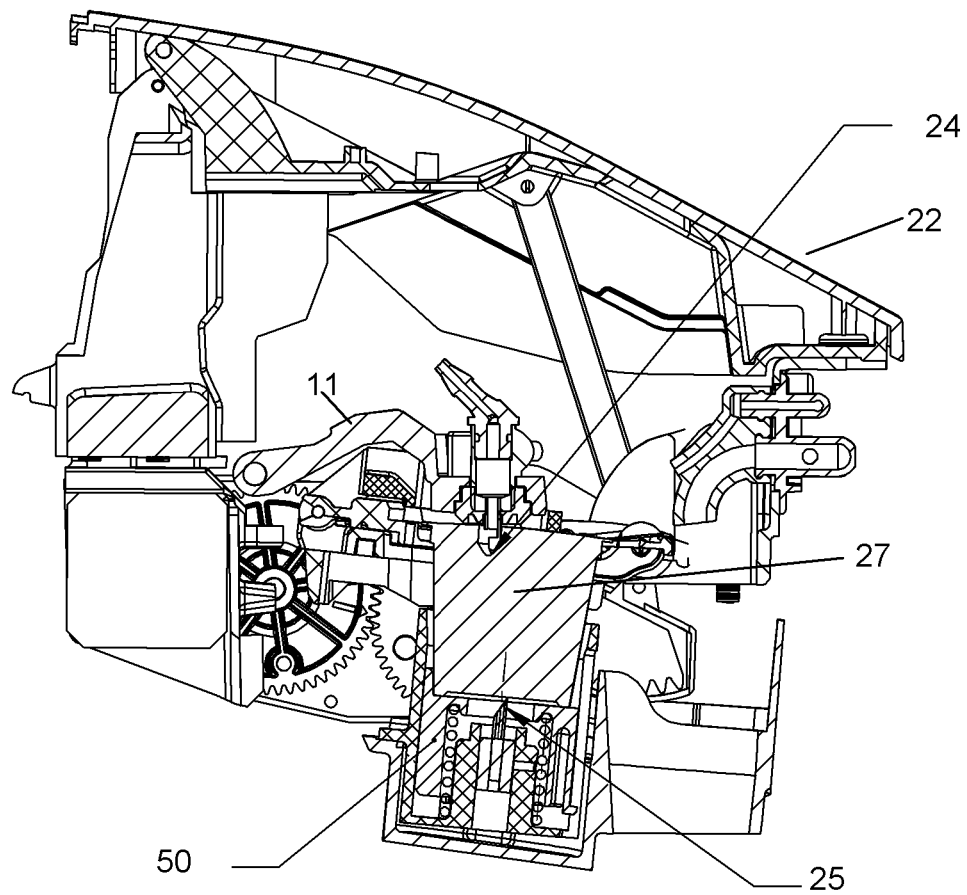

In FIG. 25, the inlet injection needle (24) punctures the top of the capsule (27) as the arm (11) reaches an approximately horizontal position. The outlet needle (25) is still below the bottom of the capsule (27) and has not yet punctured it.

Figure 26:
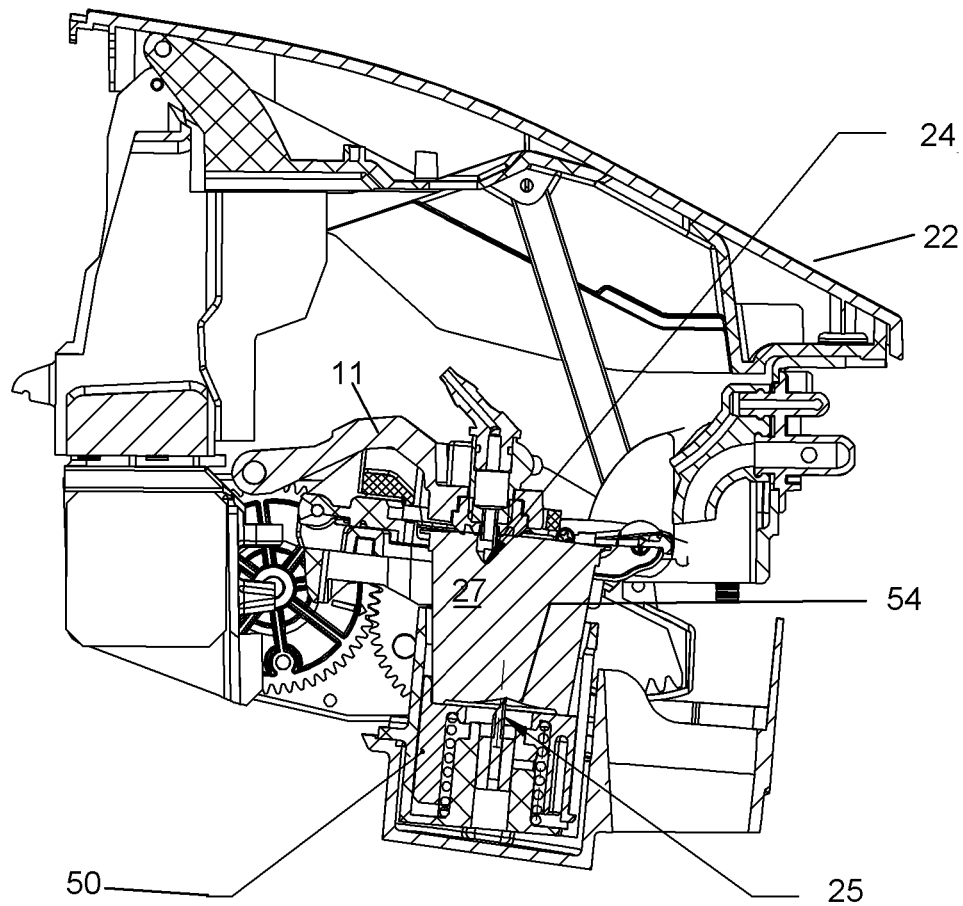

In FIG. 26, the motor-driven arm (11) begins to force the capsule (27) further downward against the spring and onto the outlet needle (25). The plastic capsule bottom (54) can deflect slightly before piercing occurs.

Figure 27:
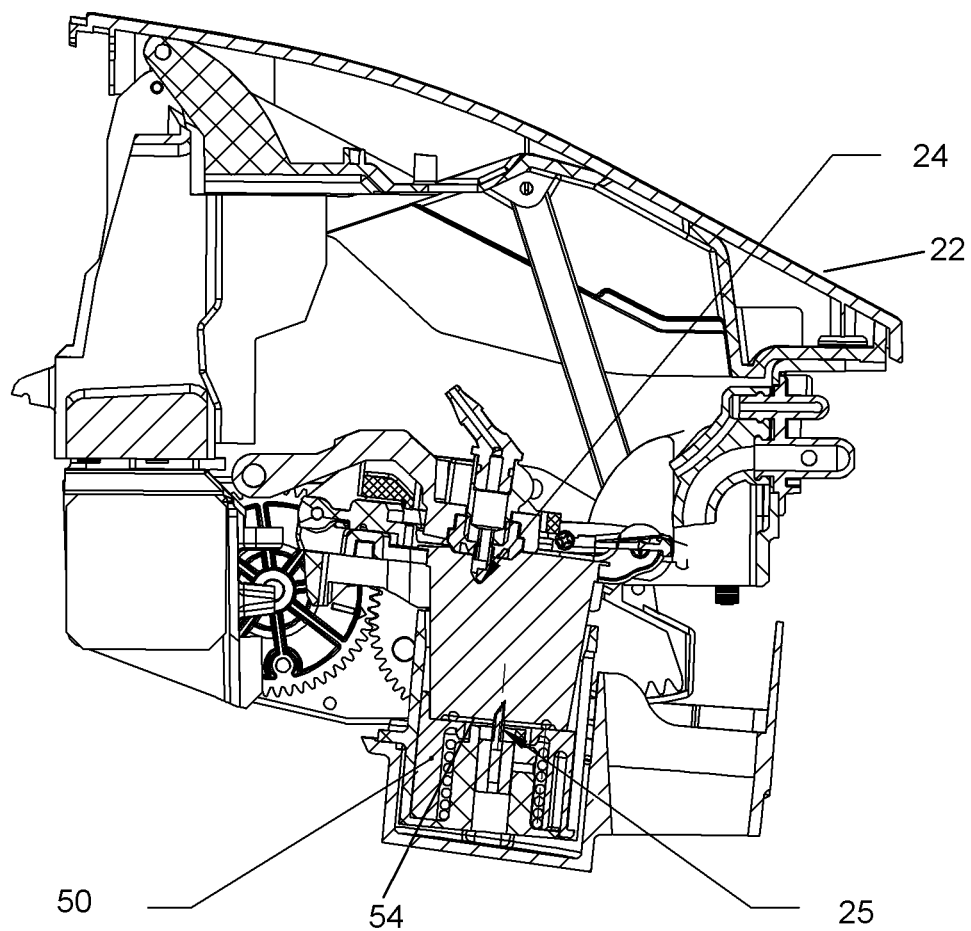

In FIG. 27, the capsule bottom (54) is punctured by the outlet needle (25) at the bottom of the capsule carrier stroke. Hot liquid can then be infused into the capsule through the inlet injection needle under pressure to produce the hot drink. The finished hot drink can be conveyed out of the bottom of the capsule though the outlet needle (25) and dispensed to a cup through a hot orifice as in other embodiments.

After the dispensing is complete, the motor-driven arm (11) returns to the vertical position shown in FIG. 22. The capsule carrier is forced upward by the carrier spring (51) to the position shown in FIG. 23. Finally, as the cover (22) is opened, the spent capsule is further forced upward by the carrier spring (51) to the position shown in FIG. 22 where it can be manually or automatically removed.

Several descriptions and illustrations have been presented to aid in understanding the present invention. One with skill in the art will understand that numerous changes and variations may be made without departing from the spirit of the invention. Each of these changes and variations is within the scope of the present invention.

We claim:

1. A beverage dispensing device adapted to dispense both hot and cold beverages comprising:
    a housing;
    a control panel mounted on the housing, the control panel configured to permit selection of a beverage;
    a controller in said housing, the controller in communication with the control panel;
    a motor-driven hot/cold drink dispensing module mounted in the housing under control of the controller, the hot/cold drink dispensing mechanism comprising:
        a chassis containing a carrier adapted to receive and hold either a cold capsule containing a cold beverage mix and a hot capsule containing a hot beverage mix;
        a cover mounted on the chassis, the cover pivotable between an open position and a closed position;
        at least one beverage exit orifice on a bottom surface of the chassis;
        a cold beverage preparation mechanism cooperating with the cover, the mechanism adapted to open an inserted cold beverage capsule as the cover is closed; the cold beverage preparation mechanism also adapted to rotate the opened cold beverage capsule from a horizontal position to a rotated position allowing an injected stream of cold liquid to mix and force its contents out through the exit orifice;
        a hot beverage preparation mechanism also cooperating with the cover, the hot beverage preparation mechanism including a capsule carrier configured receive and hold a capsule containing a hot beverage mix, the capsule having a capsule top and a capsule bottom, the capsule carrier configured to move downward against a spring as the cover is closed; the mechanism also including an outlet needle attached to the chassis below the capsule bottom; an inlet injection needle attached to a motor-driven arm adapted to puncture the capsule's top when the arm is rotated, wherein after the capsule top is punctured, the motor-driven arm forces the capsule further downward against the spring causing the outlet needle to puncture the capsule bottom; the mechanism then injecting hot liquid into the capsule through the inlet injection needle and withdrawing hot beverage through the outlet needle and conveying it to the exit orifice.

2. The beverage dispensing device of claim 1 wherein the motor-driven arm is coupled to the motor through a plurality of gears.

3. The beverage dispensing device of claim 1 wherein the cold capsule has a rim and is adapted to be cracked open along a groove on or directly under said rim.

4. The beverage dispensing device of claim 1 wherein the cold capsule contains a powdered cold drink mix.

5. The beverage dispensing device of claim 1 wherein the cold capsule contains a liquid cold drink mix.

6. The beverage dispensing device of claim 1 wherein the hot capsule contains a coffee, tea or hot chocolate mix.

7. The beverage dispensing device of claim 1 wherein the controller is a microcontroller adapted to execute stored instructions.

8. The beverage dispensing device of claim 7 wherein the stored instructions allow a user to select either a cold beverage or a hot beverage via the control panel by causing a cold liquid to be injected into the capsule when a cold beverage is selected or hot liquid to be infused into the capsule when a hot beverage is selected.

9. The beverage dispensing device of claim 1 wherein said cavity has a substantially cylindrical bottom part and a partially conical upper part.

10. The beverage dispensing device of claim 1 wherein said cover is link-connected to a ram member, the ram member adapted to secure the cold or hot capsule in the cavity and to force the hot capsule downward toward the outlet needle without puncturing the capsule bottom when the cover is closed.

11. The beverage dispensing device of claim 10 further comprising a rotating member that opens the cold capsule by rotating the cold capsule along a trajectory where a rim portion of the cold capsule encounters a protrusion attached to the chassis causing the cold capsule rim to pry away from the cold capsule.

12. The beverage dispensing device of claim 1 further comprising a sensor electrically connected to said controller cooperating with said cavity notifying the controller whether a cold capsule or a hot capsule has been inserted into said cavity.

13. The beverage dispensing device of claim 12 wherein the sensor is a camera that reads a label on the cold or hot capsule.

14. The beverage dispensing device of claim 1 further comprising a separate hot and cold orifice.

15. The beverage dispensing device of claim 1 wherein the cold liquid is filtered water.

16. The beverage dispensing device of claim 15 wherein the water is carbonated.

17. The beverage dispensing device of claim 1 wherein the hot liquid is filtered water.

18. The beverage dispensing device of claim 17 wherein the filtered water is at a temperature sufficient to brew coffee.

19. The beverage dispensing device of claim 1 wherein the housing further contains a heater mechanism.

* * * * *